(12) United States Patent
Nakane

(10) Patent No.: US 10,948,448 B2
(45) Date of Patent: Mar. 16, 2021

(54) HUMIDITY SENSOR

(71) Applicant: Taketomo Nakane, Tokyo (JP)

(72) Inventor: Taketomo Nakane, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 89 days.

(21) Appl. No.: 16/332,911

(22) PCT Filed: Sep. 28, 2017

(86) PCT No.: PCT/JP2017/035198
§ 371 (c)(1),
(2) Date: Mar. 13, 2019

(87) PCT Pub. No.: WO2018/062379
PCT Pub. Date: Apr. 5, 2018

(65) Prior Publication Data
US 2019/0257779 A1    Aug. 22, 2019

(30) Foreign Application Priority Data

Sep. 30, 2016    (JP) .............................. JP2016-195036
Mar. 17, 2017    (JP) .............................. JP2017-052768

(51) Int. Cl.
*G01N 27/22*    (2006.01)
*G01N 27/04*    (2006.01)

(52) U.S. Cl.
CPC .......... *G01N 27/223* (2013.01); *G01N 27/048* (2013.01); *G01N 27/227* (2013.01); *G01N 2027/222* (2013.01)

(58) Field of Classification Search
CPC .. G01N 27/223; G01N 27/225; G01N 27/121; G01N 27/047; G01N 27/227; B01L 2300/0636
See application file for complete search history.

(56) References Cited

U.S. PATENT DOCUMENTS 5,075,667 A  *  12/1991  Nishiwaki ............ G01N 27/121
                                                        338/35
5,075,816 A       12/1991  Stormbom
(Continued)

FOREIGN PATENT DOCUMENTS

EP    1387164        2/2004
JP    H04-155253     5/1992
(Continued)

OTHER PUBLICATIONS

International Search Report for PCT/JP2017/035198 dated Dec. 12, 2017.
(Continued)

*Primary Examiner* — Patrick Assouad
*Assistant Examiner* — Demetrius R Pretlow
(74) *Attorney, Agent, or Firm* — IPUSA, PLLC

(57) ABSTRACT

A humidity sensor includes a lower electrode formed on a substrate, a first moisture sensitive layer covering the lower electrode, an upper electrode formed on the first moisture sensitive layer, and having a predetermined opening pattern including a plurality of openings, and a second moisture sensitive layer covering the upper electrode, and the second moisture sensitive layer contacts the first moisture sensitive layer at the openings of the upper electrode.

19 Claims, 35 Drawing Sheets

(56) References Cited

U.S. PATENT DOCUMENTS

| | | | | | |
|---|---|---|---|---|---|
| 5,254,371 | A * | 10/1993 | Hegner | | G01N 27/225 |
| | | | | | 361/178 |
| 6,222,376 | B1 * | 4/2001 | Tenney, III | | G01N 27/225 |
| | | | | | 324/663 |
| 9,027,400 | B2 * | 5/2015 | Le Neel | | G01N 27/223 |
| | | | | | 73/335.04 |
| 2002/0190840 | A1 * | 12/2002 | Fujita | | G01N 27/121 |
| | | | | | 338/35 |
| 2004/0080325 | A1 * | 4/2004 | Ogura | | G01N 27/225 |
| | | | | | 324/664 |
| 2006/0186901 | A1 | 8/2006 | Itakura et al. | | |
| 2007/0210807 | A1 * | 9/2007 | Arisaka | | G01N 27/225 |
| | | | | | 324/664 |
| 2008/0061802 | A1 * | 3/2008 | Alimi | | G01N 27/225 |
| | | | | | 324/689 |
| 2009/0108852 | A1 * | 4/2009 | Alimi | | G01N 27/223 |
| | | | | | 324/664 |
| 2009/0145220 | A1 * | 6/2009 | Langenbacher | | C04B 38/04 |
| | | | | | 73/335.04 |
| 2011/0197657 | A1 * | 8/2011 | Gole | | G01N 27/127 |
| | | | | | 73/31.05 |
| 2011/0259099 | A1 * | 10/2011 | Hong | | G01N 27/223 |
| | | | | | 73/335.04 |
| 2012/0000285 | A1 * | 1/2012 | Waga | | G01N 27/225 |
| | | | | | 73/335.04 |
| 2012/0256645 | A1 * | 10/2012 | Nguyen | | G01N 27/223 |
| | | | | | 324/679 |
| 2013/0207673 | A1 | 8/2013 | Tondokoro et al. | | |
| 2013/0287062 | A1 * | 10/2013 | Mayer | | H01L 27/04 |
| | | | | | 374/142 |
| 2014/0077824 | A1 * | 3/2014 | Niimi | | G01N 27/223 |
| | | | | | 324/664 |
| 2014/0139241 | A1 * | 5/2014 | Sakai | | G01N 27/223 |
| | | | | | 324/665 |
| 2015/0001200 | A1 * | 1/2015 | Harper | | G01N 27/223 |
| | | | | | 219/209 |
| 2015/0068302 | A1 * | 3/2015 | Koo | | G01N 27/22 |
| | | | | | 73/335.04 |
| 2015/0185176 | A1 * | 7/2015 | Koo | | G01N 27/223 |
| | | | | | 73/335.04 |
| 2016/0003758 | A1 * | 1/2016 | Hong | | G01N 27/223 |
| | | | | | 324/664 |
| 2016/0025665 | A1 * | 1/2016 | Hebert | | G01N 27/223 |
| | | | | | 324/664 |
| 2016/0258894 | A1 * | 9/2016 | Futatsugi | | G01N 27/223 |
| 2017/0328855 | A1 * | 11/2017 | Cobianu | | G01N 27/223 |
| 2017/0370864 | A1 * | 12/2017 | Samarao | | G01N 27/14 |
| 2018/0202961 | A1 * | 7/2018 | Sussner | | G01N 27/3271 |

FOREIGN PATENT DOCUMENTS

| | | |
|---|---|---|
| JP | H10-221288 | 8/1998 |
| JP | 2013-133264 | 7/2013 |
| JP | 5547296 | 7/2014 |
| WO | 2011/065507 | 6/2011 |
| WO | 2012/046501 | 4/2012 |

OTHER PUBLICATIONS

Extended European search report for European Patent Application No. 17856328.4 dated Aug. 12, 2019.

Japanese Office Action for 2018-542851 dated Nov. 26, 2019.

Japanese Office Action dated Jun. 30, 2020 (JP Patent Application No. 2018-542851).

* cited by examiner

| PATTERN | A | B | C | D | E | | |
|---|---|---|---|---|---|---|---|
| STRUCTURE | (isosceles triangles) | (triangles) | (stripes) | (hexagons) | (zigzag) | | |
| No. | a | b | a | b | a | b | a | b | c |
| 1 | 150 | 160 | 20 | 30 | 50 | 26 | 840 | 120 | 340 |
| 2 | 150 | 200 | 40 | 50 | 50 | 43 | – | – | – |
| 3 | 80 | 90 | 60 | 80 | 75 | 26 | – | – | – |
| 4 | 80 | 130 | 80 | 100 | 75 | 43 | – | – | – |
| 5 | – | – | 140 | – | – | – | – | – | – |
| NOTE | h=800 Isosceles Triangle | a=b Isosceles Triangle | a=30 | Regular Hexagon | | | |

*Unit in μm

Pattern B

Pattern B-2

| Repellent Pattern | Water Adhesion Resistance* |
|---|---|
| A-1 | ○ |
| B-2 | ○ |
| B-5 | △ |
| C-2 | △ |
| None (Comparison Example) | × |

*Evaluation of Water Adhesion Resistance

○: Uneasily adheres
△: Partially adheres
×: Adheres

HUMIDITY SENSOR

TECHNICAL FIELD

The present invention relates to a humidity sensor, and more particularly to a parallel plate type humidity sensor.

BACKGROUND ART

Various kinds of sensors, including humidity sensors, temperature sensors, gas sensors, electrostatic touchscreen sensors or the like, are used in various kinds of products for industrial use and personal use. Generally, because sensor operation is affected when drops of water adhere on a surface of the sensor, protective measures are taken with respect to condensation and drops of water.

For example, in parallel plate type moisture detecting sensors having a moisture sensitive layer sandwiched between a lower electrode and an upper electrode, a structure is known to cover the upper electrode by a protection layer (for example, refer to Patent Document 1). According to this document, an opening is formed in the protection layer and the upper electrode to expose the moisture sensitive layer to an external environment, and in the opening, the moisture sensitive layer is provided up to a position at least higher than a position of a lower surface of the protection layer.

In addition, as a structure for causing the drops of water adhered on automobile window glass or the like to quickly slide down, a structure is known to form a water repellent layer on at least one surface of a base (for example, refer to Patent Document 2). This water repellent layer includes a first water repellent region and a second water repellent region having different water contact angles.

PRIOR ART DOCUMENTS

Patent Documents

Patent Document 1: Japanese Patent No. 5547296
Patent Document 2: Japanese Laid-Open Patent Publication No. 2013-133264

DISCLOSURE OF THE INVENTION

Problem to be Solved by the Invention

In the parallel plate type humidity sensor having the moisture sensitive layer sandwiched between the upper electrode and the lower electrode, when the drops of water contact a field leaking from a gap in the upper electrode, a state of an electric line of force changes, and an electrostatic capacitance value accumulated between the upper electrode and the lower electrode changes. For this reason, an accurate humidity measurement value cannot be obtained. In addition, salts and impurity components within the drops of water adhered on the surface of the humidity sensor remain as residues even after drying, and properties of the moisture sensitive layer change to make it impossible to obtain a stable sensor output.

One object of the present invention is to provide a humidity sensor that can reduce the effects of the drops of water on the humidity sensor, and can output an accurate and stable measurement value.

Means of Solving the Problem

In order to achieve the object described above, the present invention arranges a moisture sensitive layer that covers an upper electrode, and optimizes a pattern of the upper electrode, to maintain an accurate and stable output by reducing the effects of the drops of water on an electrostatic capacitance of the humidity sensor. More particularly, a humidity sensor (10A, 10B, 20) is characterized in that there are provided:

a lower electrode (13) formed on a substrate;
a first moisture sensitive layer (14a) covering the lower electrode;
an upper electrode (15) formed on the first moisture sensitive layer, and having a predetermined opening pattern including a plurality of openings (16); and
a second moisture sensitive layer (14b) covering the upper electrode,
wherein the second moisture sensitive layer contacts the first moisture sensitive layer at the openings of the upper electrode.

Reference numerals in brackets above are added to facilitate understanding, and merely show examples, and are not limited to embodiments illustrated in the drawings.

Effects of the Invention

According to the present invention, it is possible to reduce the effects of the drops of water on the humidity sensor, and output an accurate and stable measurement value.

BRIEF DESCRIPTION OF DRAWINGS

FIG. 20 is a table of structures and dimensions of the water repellent patterns.

MODE OF CARRYING OUT THE INVENTION

Figure 1:
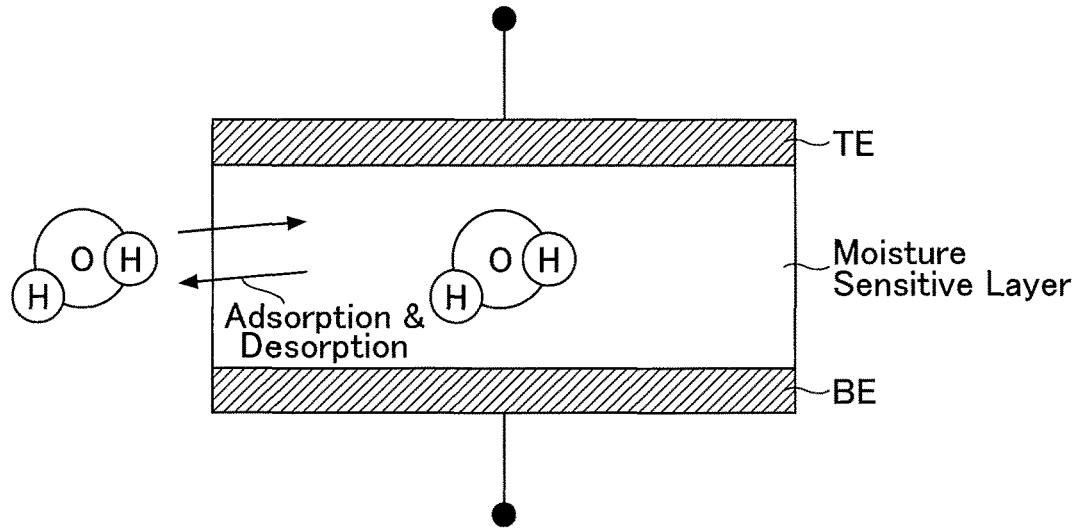
FIG. 1 is a diagram for explaining a detection principle of a humidity sensor in a first embodiment.

Embodiments of the present invention will be described hereunder, by referring to the drawings. In each of the figures, identical constituent parts are designated by identical reference numerals, and repeated description of the same constituent parts may be omitted.

First Embodiment

A first embodiment focuses particularly on a humidity sensor, amongst sensor elements, and additionally provides a moisture sensitive layer on an upper electrode to reduce effects of drops of water with respect to a state of an electric line of force, and stabilize an accuracy of humidity detection. Further, by optimizing a pattern of the upper electrode, effects of confining a leak field is increased to improve measurement accuracy.

Figure 2:
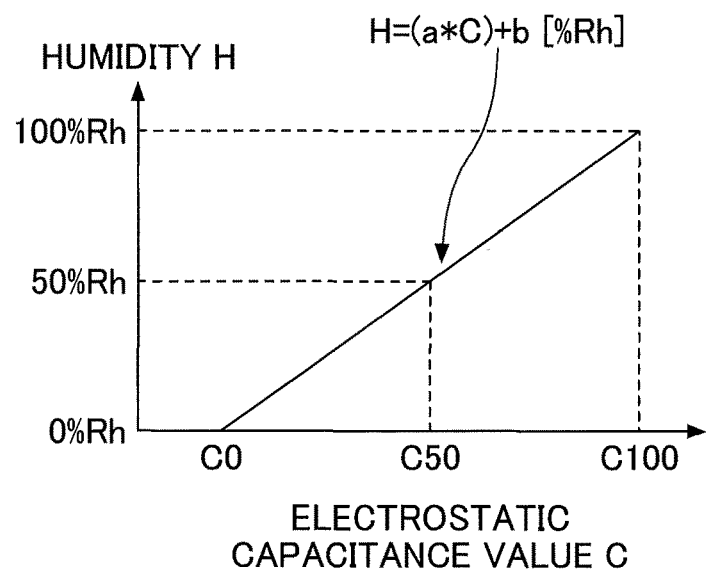
FIG. 2 is a diagram for explaining the detecting principle of the humidity sensor in the first embodiment.

FIG. 1 and FIG. 2 are diagrams for explaining a principle of the humidity sensor. As illustrated in FIG. 1, a parallel plate type humidity sensor has a structure including a moisture sensitive layer sandwiched between a lower electrode (BE) and an upper electrode (TE). Depending on the humidity, a number of water molecules adsorbed on the moisture sensitive layer differs, and a dielectric constant of the moisture sensitive layer changes. A change in an electrostatic capacitance value is detected using a difference between relative dielectric constants of the moisture sensitive layer and water.

As illustrated in FIG. 2, a change in an electrostatic capacitance value C, corresponding to a change in a relative humidity (Rh) between 0% and 100%, is measured. The electrostatic capacitance value C is measured at a plurality of known relative humidities, to obtain an approximation formula. In the example illustrated in FIG. 2, a humidity H is linearly approximated by H=a*C+b. A gradient a and an intercept b may be used as correction constants, so that the measured electrostatic capacitance value may be converted into the relative humidity.

In the parallel plate type humidity sensor, there is a case in which an opening pattern is formed in the upper electrode (TE) in order to increase a responsiveness by efficiently adsorbing the moisture included in air into the moisture sensitive layer. In this case, the field leaks out into the air from the opening in the upper electrode (TE). As described above, when the condensation and the drops of water contact the leak field, the state of the electric line of force changes, and the electrostatic capacitance value between the upper electrode (TE) and the lower electrode (BE) increases. As a result, the original approximation formula (correction constants) can no longer be used, and functions of the humidity sensor deteriorates.

Accordingly, in the first embodiment, the parallel plate type humidity sensor employs a stacked structure that includes a first moisture sensitive layer arranged between the upper electrode and the lower electrode, and a second moisture sensitive layer covering the upper electrode. Hence, it is possible to prevent the field from leaking into the air, and reduce the effects of the drops of water on the humidity sensor.

Figure 3:
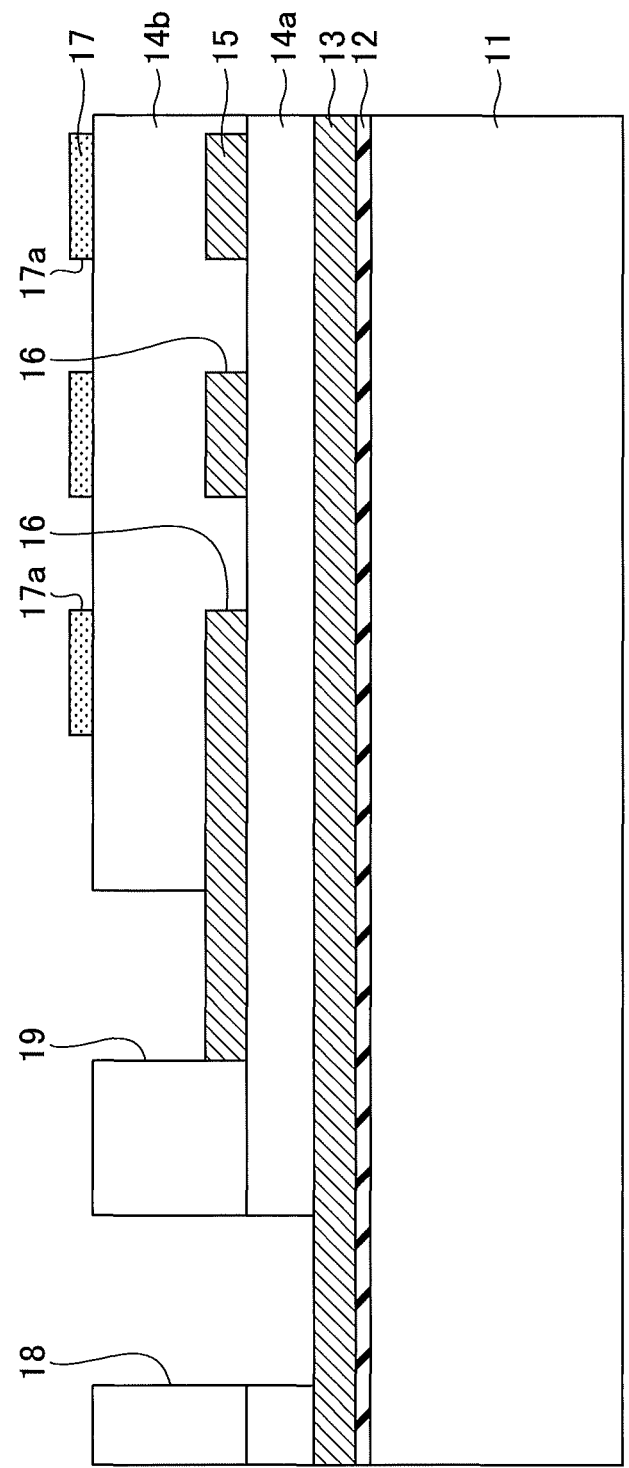
FIG. 3 is a cross sectional view generally illustrating a structure example 1 of the humidity sensor in the first embodiment.
Figure 4:
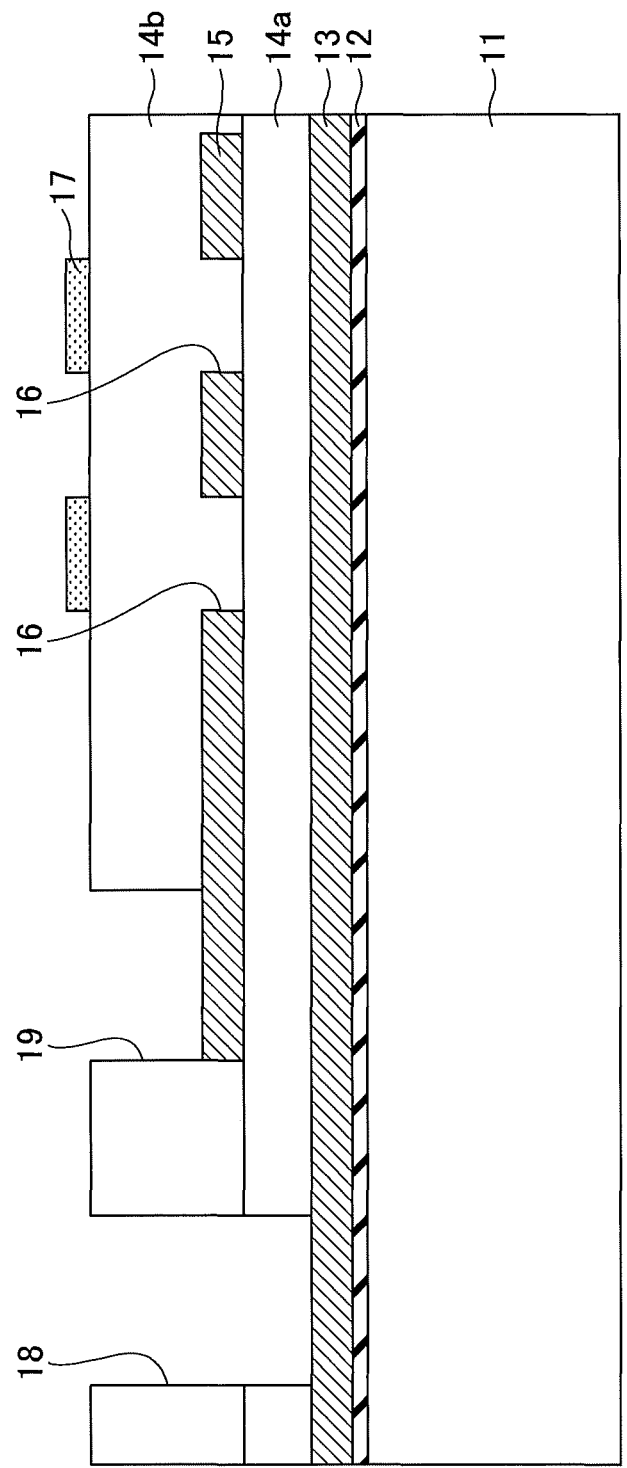
FIG. 4 is a cross sectional view generally illustrating the structure example 1 of the humidity sensor in the first embodiment.

FIG. 3 is a cross sectional view generally illustrating a structure example 1 of a humidity sensor 10A in the first embodiment. The humidity sensor 10A has a stacked structure including a lower electrode 13 provided on a substrate 11, a first moisture sensitive layer 14a provided on the lower electrode 13, an upper electrode 15 provided on the moisture sensitive layer 14a, an upper electrode 15 provided on the moisture sensitive layer 14a, a second moisture sensitive layer 14b provided on the upper electrode 15, and a protection layer 17 that are stacked in this order. It is not essential that the protection layer 17 is provided. However, from a view point of protecting the second moisture sensitive layer 14b, the protection layer 17 may be arranged on the second moisture sensitive layer 14b.

The substrate 11 may be a silicon substrate, for example, and the lower electrode 13 is formed on the substrate 11 via an insulator layer 12. In a case in which an insulating substrate is used, the insulator layer 12 may be omitted. The first moisture sensitive layer 14a, that is arranged between the lower electrode 13 and the upper electrode 15, has a thickness of 0.5 µm to 1.5 µm, and is formed by a polymer material that easily adsorbs water molecules, such as polyimide, cellulose, PMMA (polymethyl methacrylate), PVA (polyvinyl alcohol), or the like. There is a possibility of a short-circuit occurring when the thickness of the first moisture sensitive layer 14a is less than 0.5 µm, and it becomes difficult to maintain a high responsiveness or sensitivity when the thickness exceeds 1.5 µm.

The upper electrode 15 includes predetermined openings 16, and the first moisture sensitive layer 14a and the second moisture sensitive layer 14b communicate within the openings 16. The openings 16 are preferably as small as possible. The smaller the openings 16 are, the more sufficiently the effects of confining the leak field can be exhibited. In addition, a width of the upper electrode 15 is preferably narrow. The width of the upper electrode 15, which enables the water molecules included in the air to be efficiently adsorbed into the first moisture sensitive layer 14a, may be set to an optimum design value by taking the properties and processes into consideration.

By arranging the second moisture sensitive layer 14b to cover the upper electrode 15, the drops of water can be prevented from contacting the leak field, even when the field leaks from the openings 16 in the upper electrode 15. The second moisture sensitive layer 14b may be made of the same kind of layer as the first moisture sensitive layer 14a, or may be made of a different kind of layer. A thickness of the second moisture sensitive layer 14b is 1 to 10 times the thickness of the first moisture sensitive layer 14a. When the thickness of the second moisture sensitive layer 14b becomes thinner than the thickness of the first moisture sensitive layer 14a, it becomes difficult to effectively prevent the drops of water from contacting the leak field. When the thickness of the second moisture sensitive layer 14b becomes more than 10 times the thickness of the first moisture sensitive layer 14a, it becomes difficult to quickly adsorb the water molecules into the first moisture sensitive layer 14a.

It is not essential to provide the protection layer 17. However, in the example illustrated in FIG. 3, the protection layer 17 is formed on the second moisture sensitive layer 14b at positions corresponding to the pattern of the upper electrode 15. By providing openings 17a in the protection layer 17 at positions corresponding to the openings 16 of the upper electrode 15, it is possible to prevent drops of water and dirt from adhering on the second moisture sensitive layer 14b, and also adsorb the moisture (water molecules) included in the air into the first moisture sensitive layer 14a via a shortest path. Further, the protection layer 17 may be provided directly on the over the openings 16. In this case, it is possible to avoid the effects of a weak leak field generated between the upper electrode 15 and the lower electrode 13. In this case, in order to exhibit the effects of confining the field, it is desirable that a relative dielectric constant of the protection layer is greater than that of the moisture sensitive layer 14b.

The protection layer 17 may be made of an arbitrary material, such as a metal or an insulator, for example, that does not change a conductivity of the upper electrode 15 and can prevent deterioration of the second moisture sensitive layer 14b. Thick film pads for wiring bonding may be arranged in place of the protection layer 17.

The humidity sensor 10A includes an opening 18 that is formed to draw out an electrode that reaches the lower electrode 13, and an opening 19 that is formed to draw out an electrode that reaches the upper electrode 15. A predetermined voltage is applied between the upper electrode 15 and the lower electrode, the electrostatic capacitance C is measured, and the relative humidity is computed using the approximation formula (correction constants) acquired in advance. According to the structure of FIG. 3, the upper electrode 15 provides the effects of confining the leak field, and the second moisture sensitive layer 14b protects a main sensor part from the water molecules that may adhere onto the main sensor part. Hence, the measured electrostatic capacitance can be accurately converted into the relative humidity.

A brief description of manufacturing processes of the humidity sensor 10A illustrated in FIG. 3 will be described. A silicon oxide layer is formed on the substrate 11 that is made of silicon or the like, as the insulator layer 12, to a thickness of 0.5 μm, for example. A conductive layer made of aluminum (Al), gold/nickel (Au/Ni), or the like is formed on the insulator layer 12. A resist layer is formed on the conductive layer, and the resist layer is patterned into a resist pattern having a predetermined shape by photolithography. The resist pattern is used as a mask, and the conductor layer is formed by an ion milling, a wet etching, or the like, to form the lower electrode 13 to a desired shape. A thickness of the lower electrode 13 is set to an appropriate thickness from a viewpoint of reducing the sensor size and stably applying the voltage, and is set to 0.5 μm, for example. Thereafter, the resist pattern is removed and the structure is cleaned.

The first moisture sensitive layer 14a is deposited to cover the lower electrode 13. The polymer material described above may be coated to a thickness of 0.5 μm to 1.5 μm by spin coating, a bar coater, a spray coater, or the like. Although not illustrated in FIG. 3, a resist layer is formed on the moisture sensitive layer 14a, and a resist pattern having a predetermined shape is formed by photolithography. The resist pattern is used as a mask, and the moisture sensitive layer 14a may be etched by a RIE (Reactive Ion Etching) or the like to form a predetermined pattern. A conductive layer, such as Al, Au/Ni, or the like is formed on the moisture sensitive layer 14a, and a resist layer is formed on the conductive layer, to form a resist pattern having a predetermined shape by photolithography. The resist pattern is used as a mask, and the upper electrode 15 having a predetermined opening pattern is formed by a process, such as ion milling or the like. The upper electrode 15 is set to an appropriate thickness from a viewpoint of accurately patterning the openings 16 and stably applying the voltage, and is formed to a thickness of 0.2 μm to 0.3 μm, for example. Thereafter, the resist pattern is removed and the structure is cleaned.

The second moisture sensitive layer 14b having a thickness of 0.5 μm to 10 μm, for example, is formed on the upper electrode 15. The openings 16 of the upper electrode 15 are buried by the second moisture sensitive layer 14b. The protection layer 17 made of the metal, insulator, or the like and having the predetermined openings 17a is formed on the second moisture sensitive layer 14b, if required. Thereafter, a resist mask having an opening at a position corresponding to the opening to draw out the electrode is formed, and the second moisture sensitive layer 14b is partially removed by RIE or the like to expose a part of the upper electrode 15 at a predetermined position. The resist is once removed, a resist mask for drawing out the lower electrode is formed, and the second moisture sensitive layer 14b and the first moisture sensitive layer 14a are partially removed by RIE or the like to expose a part of the lower electrode 13. Thereafter, the resist pattern is removed, the structure is cleaned, and the structure illustrated in FIG. 3 is obtained.

Figure 5:
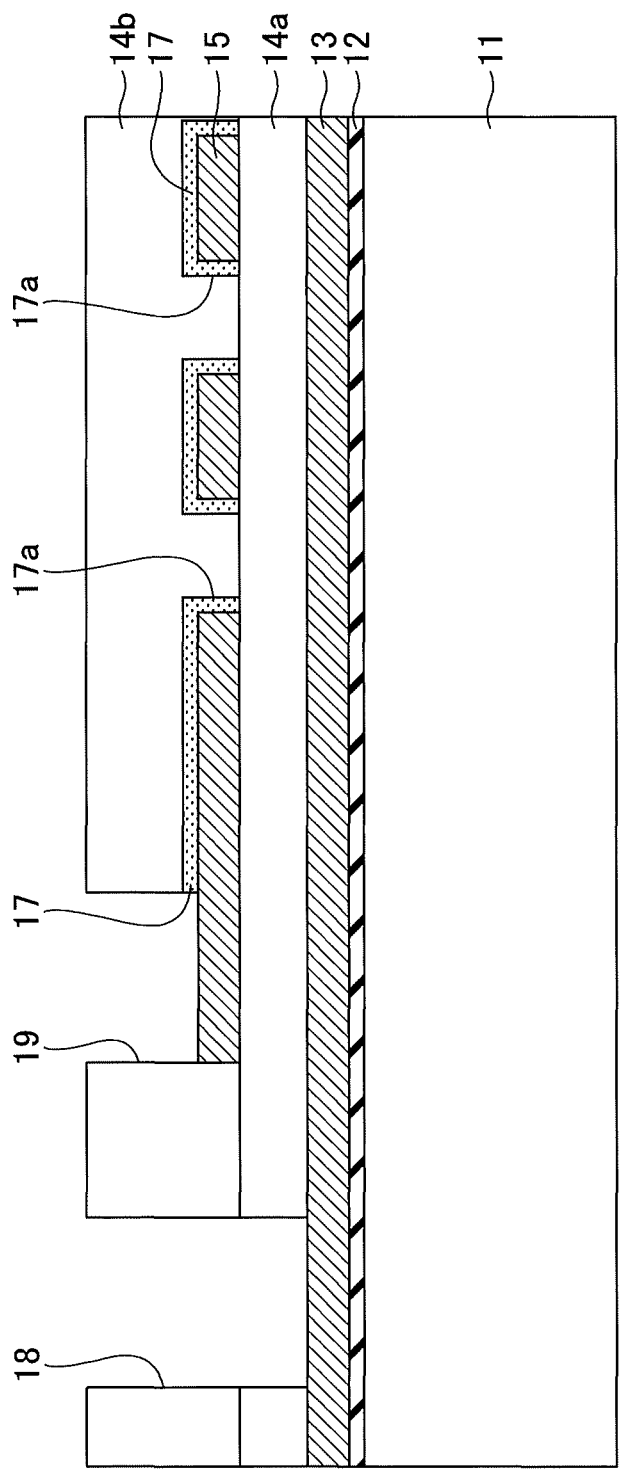
FIG. 5 is a cross sectional view illustrating a structure example 2 of the humidity sensor in the first embodiment.

FIG. 5 illustrates a humidity sensor 10B, as a structure example 2 of the first embodiment. Similarly to FIG. 3, the humidity sensor 10B includes the first moisture sensitive layer 14a sandwiched between the lower electrode 13 and the upper electrode 15, and the second moisture sensitive layer 14b covering the upper electrode 15. The materials, the thicknesses, or the like of the first moisture sensitive layer 14a and the second moisture sensitive layer 14b are the same as in the structure example 1 of FIG. 3. An area ratio of conductive regions of the upper electrode 15 and the openings 16 is also the same as in the structure example 1 of FIG. 3.

This structure differs from the structure of FIG. 3 in that the protection layer 17 is formed to directly cover the upper electrode 15. It is not essential, also in the example of FIG. 5, that the protection layer 17 is provided. The protection layer 17 covers the upper surface and side surfaces of the upper electrode 15, excluding a region exposed within the opening 19 that is formed to draw out the electrode. The upper electrode 15 and the protection layer 17 include the openings 17a for adsorbing the water molecules included in the air into the first moisture sensitive layer 14a. Because the upper surface and the side surfaces of the upper electrode 15 are covered by the protection layer 17, it is possible to reduce the field itself that leaks from the openings 17a. In addition, because the second moisture sensitive layer 14b is formed on an upper part of the upper electrode 15, it is possible to prevent the drops of water from adhering onto the upper electrode 15. According to the structure of FIG. 5, the drops of water can also be prevented from contacting the leak field.

Figure 6A:
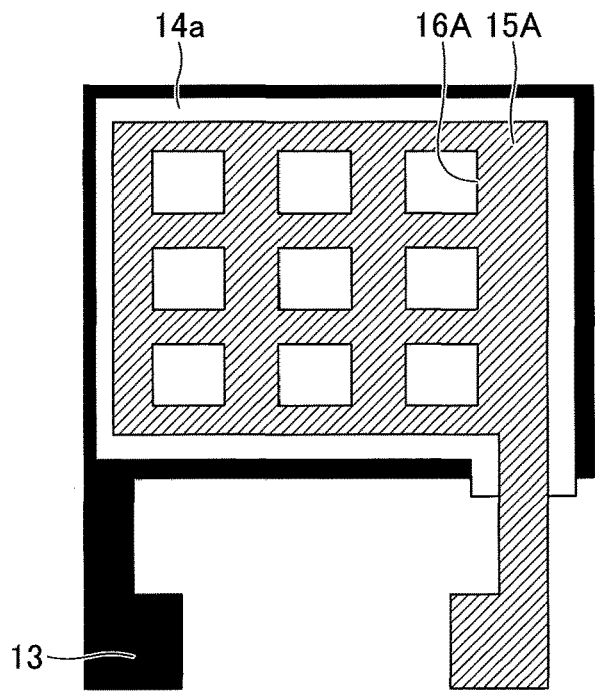
FIG. 6A is a diagram illustrating an example of an electrode pattern used in the humidity sensor in the first embodiment.
Figure 6B:
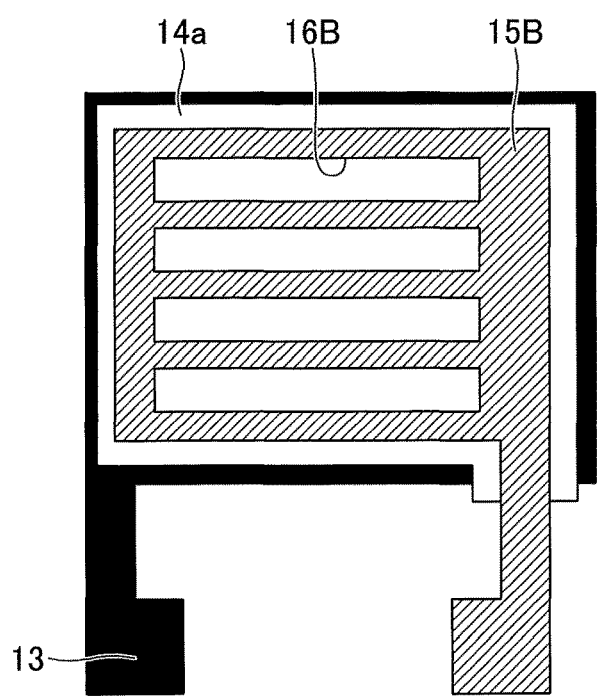
FIG. 6B is a diagram illustrating an example of the electrode pattern used in the humidity sensor in the first embodiment.

FIG. 6A and FIG. 6B illustrate examples of the pattern of the upper electrode 15. The pattern of an upper electrode 15A of FIG. 6A is a lattice-like pattern formed on the first moisture sensitive layer 14a on the lower electrode 13, and includes openings 16A. The pattern of an upper electrode 15B of FIG. 6B is a ladder-like pattern formed on the first moisture sensitive layer 14a, and includes openings 16B extending in one direction. In FIG. 6A and FIG. 6B, the illustration of the second moisture sensitive layer 14b is omitted for the sake of convenience, however, the second moisture sensitive layer 14b is arranged on the pattern of each of the upper electrodes 15A and 15B, and thus, the contact of the drops of water to the field from the openings 16A and 16B can be reduced. At the same time, the water molecules included in the air can be adsorbed from the openings 16A and 16B into the first moisture sensitive layer 14a via the shortest path.

Figure 7A:
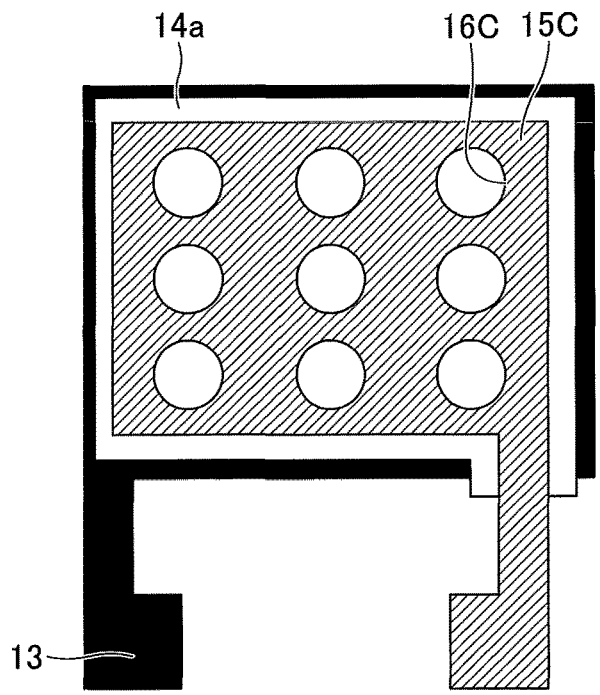
FIG. 7A is a diagram illustrating another example of the electrode pattern used in the humidity sensor in the first embodiment.
Figure 7B:
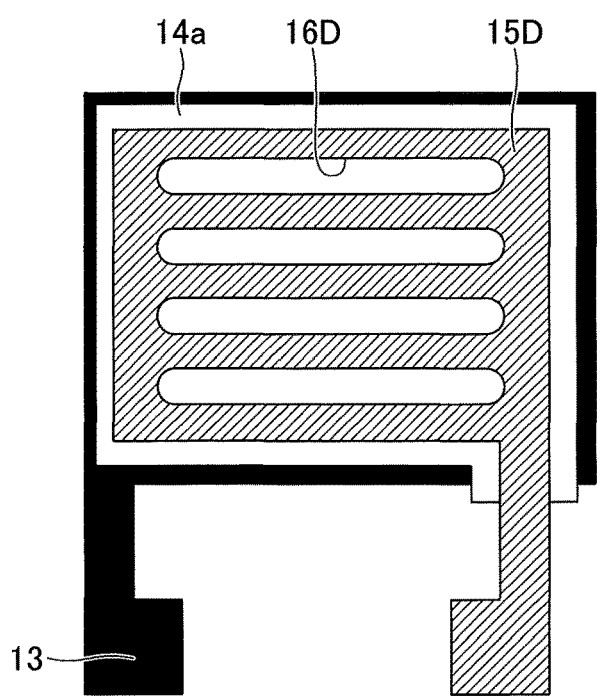
FIG. 7B is a diagram illustrating another example of the electrode pattern used in the humidity sensor in the first embodiment.

FIG. 7A and FIG. 7B illustrate other examples of the pattern of the upper electrode 15. The pattern of an upper electrode 15C of FIG. 7A is a lattice-like pattern formed on the first moisture sensitive layer 14a on the lower electrode 13, and includes circular openings 16C. The openings 16C may have a polygonal shape such as a pentagonal shape having five or more corners, instead of the circular shape. In addition, when the openings 16C have the circular shape or the polygonal shape such as the pentagonal shape having five or more corners, it is possible to reduce inconsistencies of the process, improve the yield, and reduce the manufacturing cost. When forming the openings 16 in the upper electrode 15 by a wet process using a chemical solution, for example, the inconsistencies in the process include an error from design dimensions caused by the chemical solution that flows to unwanted parts or the like. The pattern of an upper electrode 15D of FIG. 7B is a ladder-like pattern formed on the first moisture sensitive layer 14a, and includes openings 16D extending in one direction and having corner parts that are R (Round) chamfered. When the openings 16D have the corner parts that are R chamfered, it is possible to reduce the inconsistencies of the process, improve the yield, and reduce the manufacturing cost. When forming the openings 16 in the upper electrode 15 by the wet process using the chemical solution, for example, the inconsistencies in the process include the error from the design dimensions caused by the chemical solution that flows to the unwanted parts or the like. In FIG. 7A and FIG. 7B, the illustration of the second moisture sensitive layer 14b is omitted for the sake of convenience, however, the second moisture sensitive layer 14b is arranged on the pattern of each of the upper electrodes 15C and 15D, and thus, the contact of the drops of water to the field from the openings 16C and 16D can be reduced. At the same time, the water molecules included in the air can be adsorbed from the openings 16C and 16D into the first moisture sensitive layer 14a via the shortest path.

Figure 8:
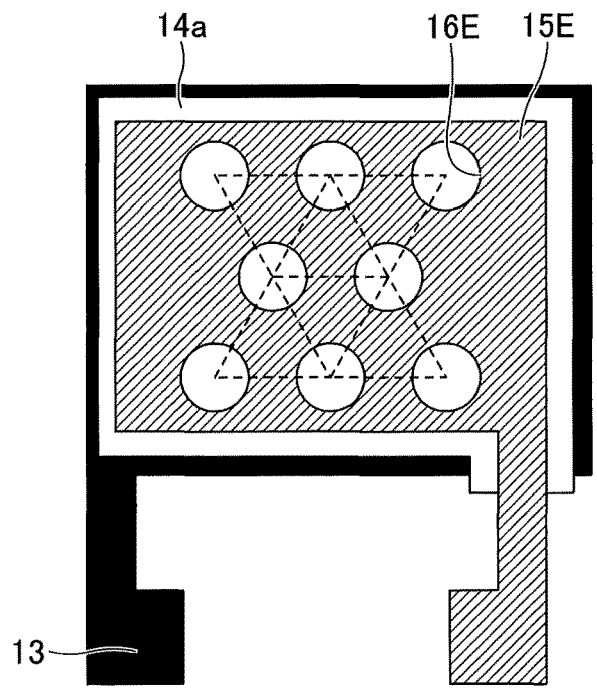
FIG. 8 is a diagram illustrating still another example of the electrode pattern used in the humidity sensor in the first embodiment.

FIG. 8 illustrates still another example of the pattern of the upper electrode 15. The pattern of an upper electrode 15E of FIG. 8 is a staggered pattern arranged on the first moisture sensitive layer 14a on the lower electrode 13, and includes openings 16E. Because the pattern of the upper electrode 15E is the staggered pattern, a distance between adjacent openings 16E can be made short, and thus, a time it takes for the water molecules to reach the entire first moisture sensitive layer 14a is reduced, and time responsiveness improves. The example of FIG. 8 uses a 60° staggered arrangement in which the opening 16E is arranged at each vertex of an equilateral triangle, however, a 45° staggered arrangement may be used. However, the 60° staggered arrangement is preferably used from a viewpoint that the time it takes for the water molecules to reach the entire first moisture sensitive layer 14a is particularly reduced. In the patterns of the upper electrode 15 having the different structures, the openings 16E may have various shapes, and may have the circular shape illustrated in FIG. 8, for example, or may have a rectangular shape, or a polygonal shape such as a pentagonal shape having five or more corners. In FIG. 8, the illustration of the second moisture sensitive layer 14b is omitted for the sake of convenience, however, the second moisture sensitive layer 14b is arranged on the pattern of the upper electrode 15E, and thus, the contact of the drops of water to the field from the openings 16E can be reduced. At the same time, the water molecules included in the air can be adsorbed from the openings 16E into the first moisture sensitive layer 14a via the shortest path.

Figure 9:
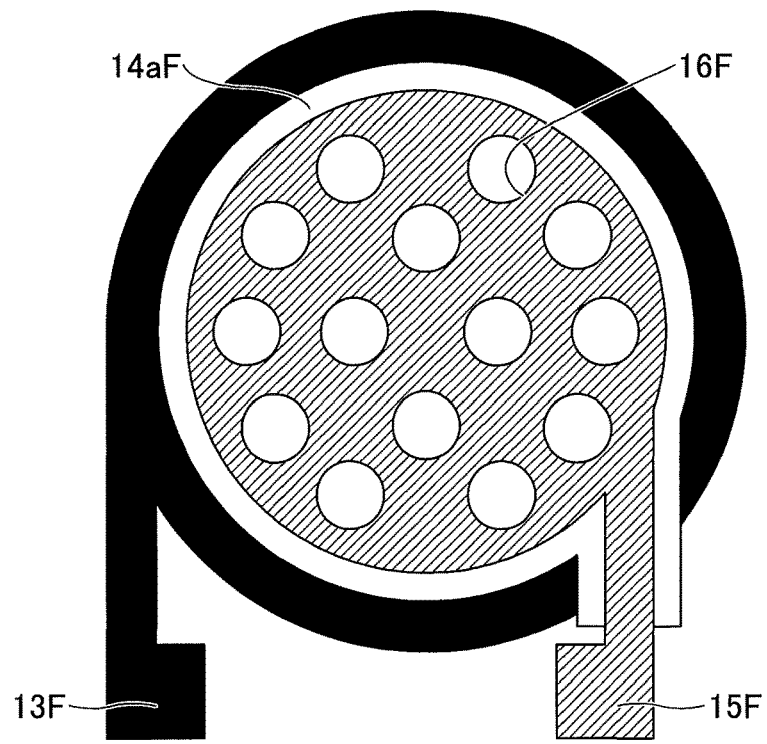
FIG. 9 is a diagram illustrating another example of shapes of a lower electrode and an upper electrode used in the humidity sensor in the first embodiment.

Another example of the shapes of the lower electrode 13 and the upper electrode 15 will be described. FIG. 9 illustrates the other examples of the shapes of the lower electrode 13 and the upper electrode 15. In the examples described above, the lower electrode 13 and the upper electrode 15 have rectangular outlines, however, the outlines are not limited to the rectangular shape. The lower electrode 13 and the upper electrode 15 preferably have shapes such that the outlines of regions where the lower electrode 13 and the upper electrode 15 overlap in a plan view have a shape corresponding to the shape of openings 107 of a sensor device 100 which will be described later. More particularly, in a case in which the openings 107 of the sensor device 100 have a circular shape, for example, the outlines of the regions where the lower electrode 13 and the upper electrode 15 overlap in the plan view preferably have a circular shape in correspondence with the shape of the openings 107, as illustrated in FIG. 9. In addition, in cases, in which the openings 107 of the sensor device 100 have an oval shape, a semi-circular shape, and a polygonal shape, for example, the outlines of the regions where the lower electrode 13 and the upper electrode 15 overlap in the plan view preferably have an oval shape, a semi-circular shape, and a polygonal shape in correspondence with the shape of the openings 107. When designing the actual package, a chip mounting error may be generated depending on a mounting device and an adhesive resin. Further, depending on a package forming method, an error or the like may be generated due to a mold that is used. For this reason, a clearance or a margin is provided. The closer the outline of the region where a lower electrode 13F and an upper electrode 151 overlap is to the shape of the opening 107 of the sensor device 100, the clearance or the margin provided between the outline of the region where the lower electrode 13F and the upper electrode 15 F overlap (referred to as the outline of the overlapping region) and the opening 107 may be set to approximately the same distance for the entire perimeter of the opening 107, and the designing is facilitated compared to a case in which the outline of the overlapping region and the shape of the opening 107 are different. Even in a structure in which the lower electrode 13 and the upper electrode 15 have shapes different from the above, openings 16F may have various shapes, and may have a circular shape as illustrated in FIG. 9 for example, a rectangular shape, or a polygonal shape having five or more corners. In addition, although the illustration of the second moisture sensitive layer 14b is omitted in FIG. 9 for the sake of convenience, the second moisture sensitive layer 14b is arranged on the upper electrode 15F having any pattern, and for this reason, the drops of water can be prevented from contacting the leak field that leaks from the openings 16F. At the same time, the water molecules included in the air can be adsorbed from the openings 16F into a first moisture sensitive layer 14aF via the shortest path.

The measurement accuracy of the humidity sensors 10A and 10B may vary according to the opening pattern of the upper electrode 15. In addition, it should be possible to optimize the thickness of the second moisture sensitive layer 14b. Hence, a response characteristic of the sensor is simulated by varying a line-and-space of the upper electrode 15 and the thickness of the second moisture sensitive layer 14b to various values.

Figure 10A:
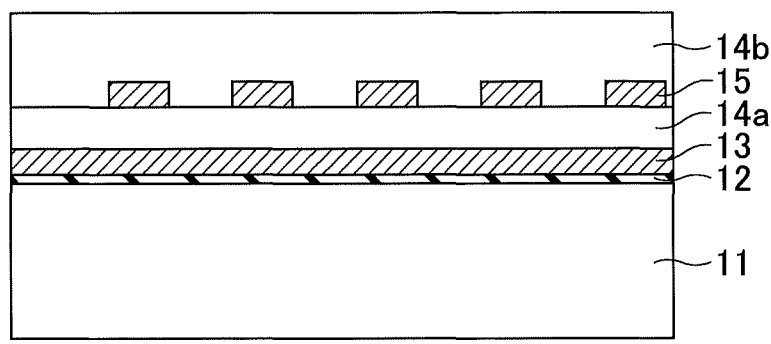
FIG. 10A is a diagram illustrating a sensor structure of an embodiment for confirming effects of the humidity sensor in the first embodiment.
Figure 10B:
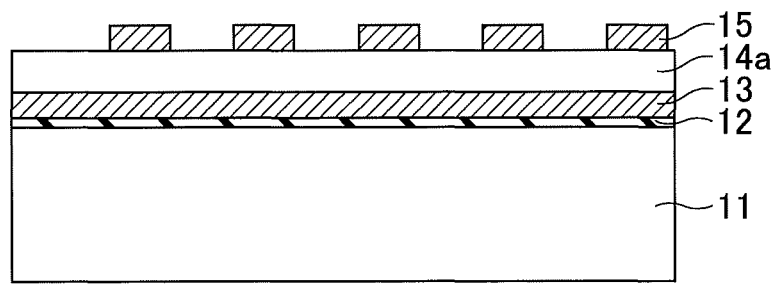
FIG. 10B is a diagram illustrating a sensor structure of a comparison example for confirming the effects of the humidity sensor in the first embodiment.

FIG. 10A and FIG. 10B are diagrams illustrating structures of a humidity sensor 20 in an embodiment together with a comparison example, for confirming the effects of the humidity sensor in the first embodiment. FIG. 10A illustrates the structure of the humidity sensor 20 in the embodiment, and FIG. 10B illustrates the structure of a humidity sensor of the comparison example. A basic structure of the humidity sensor 20 of FIG. 10A is the same as the structures of the humidity sensor 10A of FIG. 3 and the humidity sensor 10B of FIG. 5, except that the protection layer 17 is not used. In this example, the thickness of the insulator layer 12 is 1 μm, and the thickness of the first moisture sensitive layer 14a is 1 μm. The thickness of the second moisture sensitive layer 14b is varied to 1 μm, 3 μm, and 5 μm. The structure of the comparison example of FIG. 10B is the same as the structure of the humidity sensor 20 of FIG. 10A, except that the second moisture sensitive layer 14b is not used.

Figure 11A:
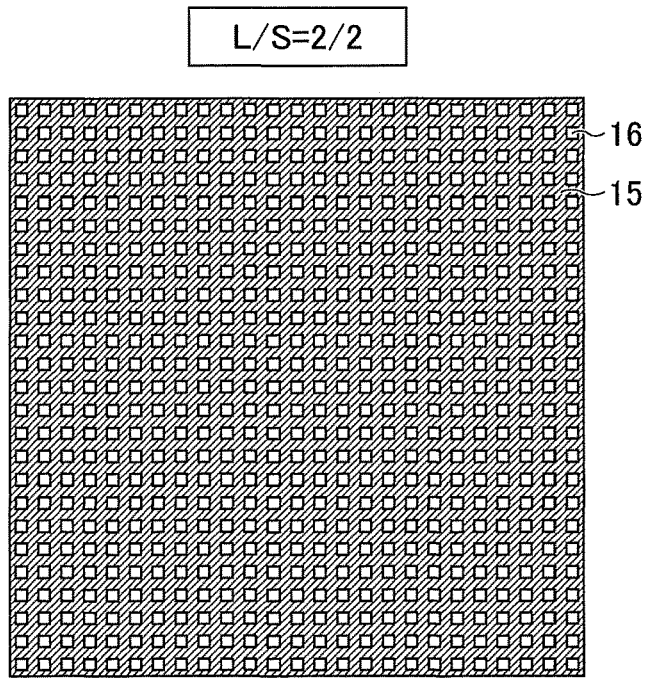
FIG. 11A is a diagram for explaining a simulation model of an upper electrode pattern.
Figure 11B:
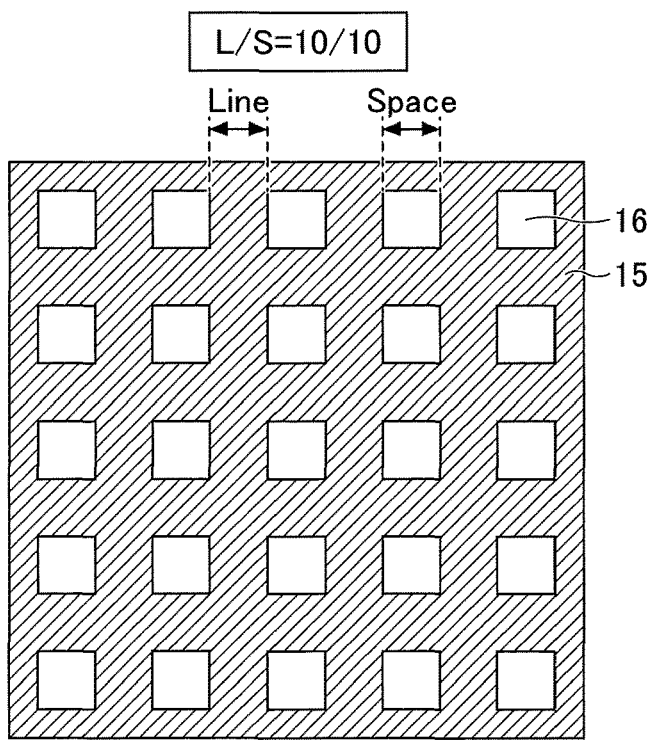
FIG. 11B is a diagram for explaining the simulation model of the upper electrode pattern.

FIG. 11A and FIG. 11B are diagrams for explaining simulation models of the upper electrode pattern. In each of FIG. 10A and FIG. 10B, the lower electrode 13 is a solid layer having an outline that is 100 μm×100 μm. The upper electrode 15 has an outline that is 100 μm×100 μm, and the line-and-space (L/S) that defines the lattice-like electrode pattern is varied to 1/1, 2/2, 5/5, and 10/10 (units are all in μm). A total number of the openings 16 is set so as to maintain an area ratio of the electrode regions and the openings 16 to 3:1 according to design (approximately 3:1 according to actual dimensions including manufacturing variations). FIG. 11A illustrates an example in which the L/S is set to 2 μm/2 μm, and FIG. 11B illustrates an example in which the L/S is set to 10 μm/10 μm.

The conditions described in conjunction with FIG. 10A and FIG. 10B are used for parameters of constituent elements other than the upper electrode. Relative dielectric constants of the materials used in the simulation are as follows.

Air 1
Water 80
Insulator layer 12 3.3
First moisture sensitive layer 14a (when dry, that is, assuming 0% Rh) 3.0
First moisture sensitive layer 14a (at high humidity, that is, assuming 100% Rh) 3.3

Figure 12A:
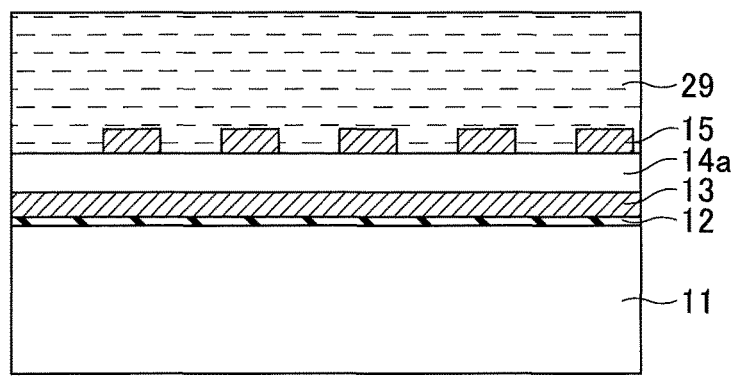
FIG. 12A is a diagram for explaining effects of water adherence in the sensor structure of the comparison example.
Figure 12B:
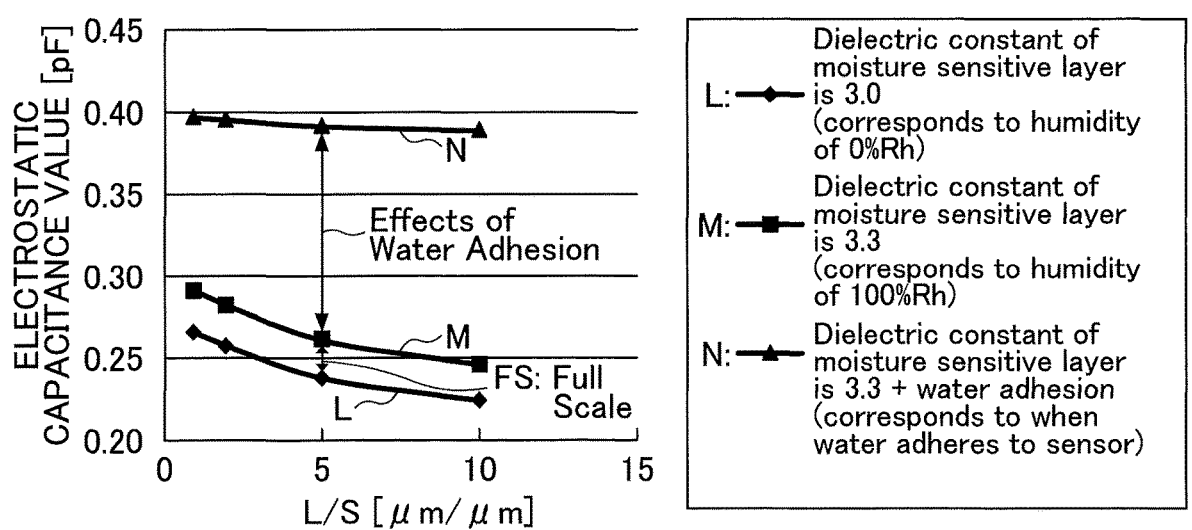
FIG. 12B is a diagram for explaining the effects of the water adherence in the sensor structure of the comparison example.
Figure 12C:
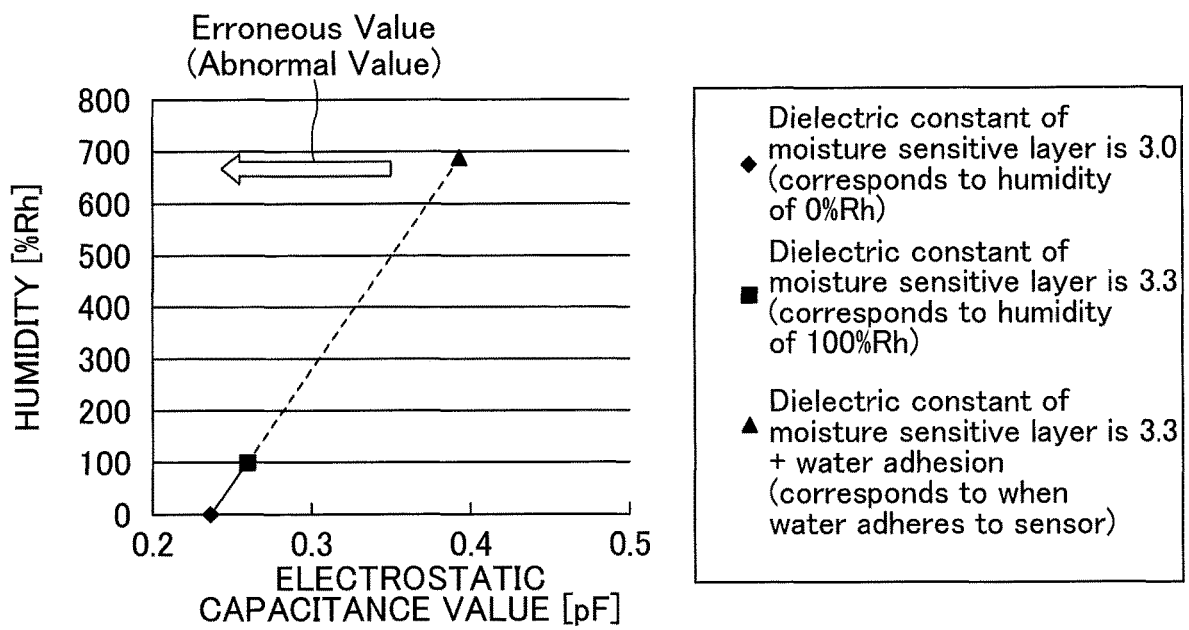
FIG. 12C is a diagram for explaining the effects of the water adherence in the sensor structure of the comparison example.

FIG. 12A, FIG. 12B, and FIG. 12C are diagrams for explaining effects of water adherence in the sensor structure of the comparison example. As illustrated in FIG. 12A, water 29 adheres to the sensor of the comparison example having no second moisture sensitive layer 14b, and states of the first moisture sensitive layer 14a are compared between when dry (humidity of 0% Rh) and at high humidity (humidity of 100% Rh).

FIG. 12B illustrates simulation results of the electrostatic capacitance [pF] when the L/S [μm/μm] is varied to 1/1, 2/2, 5/5, and 10/10 in the structure of the comparison example. In FIG. 12B, a line L plotted by diamond-shaped marks indicates a change in the electrostatic capacitance when the first moisture sensitive layer 14a is dry (humidity of 0% Rh and a relative dielectric constant of 3.0). A line M plotted by square-shaped marks indicates the change in the electrostatic capacitance when the first moisture sensitive layer 14a is at high humidity (humidity of 100% Rh and a relative dielectric constant of 3.3). A line N plotted by triangular marks indicates the change in the electrostatic capacitance when the first moisture sensitive layer 14a is in the state (high-humidity state+water adherence) in which the water is adhered on the sensor as illustrated in FIG. 12A.

Profiles of the electrostatic capacitances according to the change in the L/S are approximately parallel for the line L and the line M. A difference between the electrostatic capacitances when dry (0% Rh) and at high humidity (100% Rh) is in a range (full scale) measurable by the sensor, and as illustrated in FIG. 12C, and the electrostatic capacitance value and a relative humidity can be approximated by a linear relationship between 0% Rh and 100% Rh.

On the other hand, in the state in which the water is adhered on the sensor, the electrostatic capacitance value indicates an abnormally high value regardless of the change in the L/S. When a conversion is made using an approximation formula, the conversion results in an abnormally high relative humidity as illustrated in FIG. 12C, and an erroneous measurement value is output.

Figure 13A:
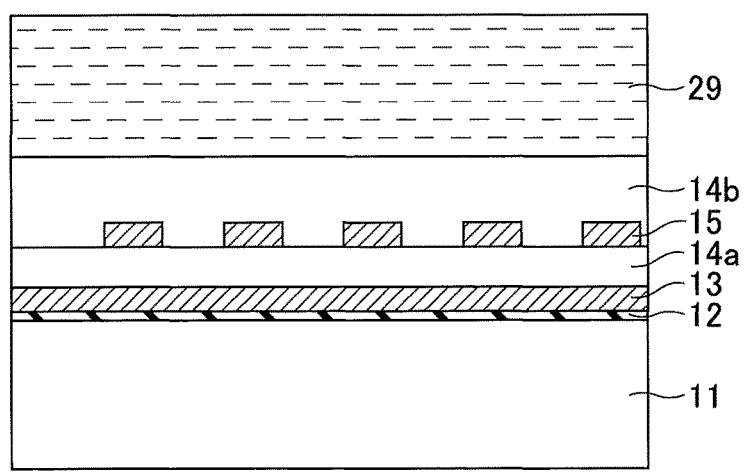
FIG. 13A is a diagram illustrating effects of preventing the effects of the water adherence in the sensor structure of the embodiment.
Figure 13B:
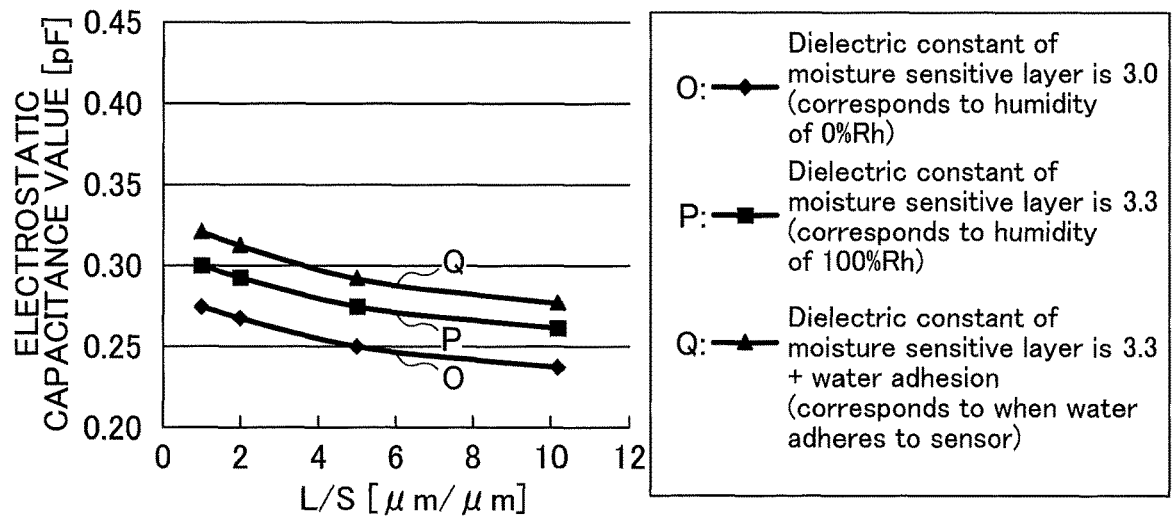
FIG. 13B is a diagram illustrating the effects of preventing the effects of the water adherence in the sensor structure of the embodiment.

FIG. 13A and FIG. 13B are diagrams illustrating effects of preventing the effects of the water adherence in the sensor structure of the embodiment. As illustrated in FIG. 13A, the water 29 adheres to the sensor having the second moisture sensitive layer 14b, and the states of the first moisture sensitive layer 14a are compared between when dry (humidity of 0% Rh) and at high humidity (humidity of 100% Rh), similarly as in FIG. 12A, FIG. 12B, and FIG. 12C.

FIG. 13B illustrates simulation results of the electrostatic capacitance [pF] when the L/S [μm/μm] is varied to 1/1, 2/2, 5/5, and 10/10 in the structure of the embodiment. In FIG. 13B, a line O plotted by diamond-shaped marks indicates a change in the electrostatic capacitance when the first moisture sensitive layer 14a is dry (humidity of 0% Rh and a relative dielectric constant of 3.0). A line P plotted by square-shaped marks indicates the change in the electrostatic capacitance when the first moisture sensitive layer 14a is at high humidity (humidity of 100% Rh and a relative dielectric constant of 3.3). A line Q plotted by triangular marks indicates the change in the electrostatic capacitance when the first moisture sensitive layer 14a is in the state (high-humidity state+water adherence) in which the water is adhered on the sensor as illustrated in FIG. 13A.

In FIG. 13B, profiles of the electrostatic capacitances according to the change in the L/S are approximately parallel for the line O, the line P, and the line Q. Unlike and greatly differing from FIG. 12A, FIG. 12B, and FIG. 12C, the electrostatic capacitance does not indicate an abnormally high value even when the water adheres on the sensor, and the electrostatic capacitance changes with the profile that is the same as that in the state in which no water is adhered on the sensor. Accordingly, in a case in which the value after the conversion exceeds 100% Rh, a humidity measurement value that is approximately accurate can be obtained by performing a correction to subtract a predetermined value.

Figure 14:
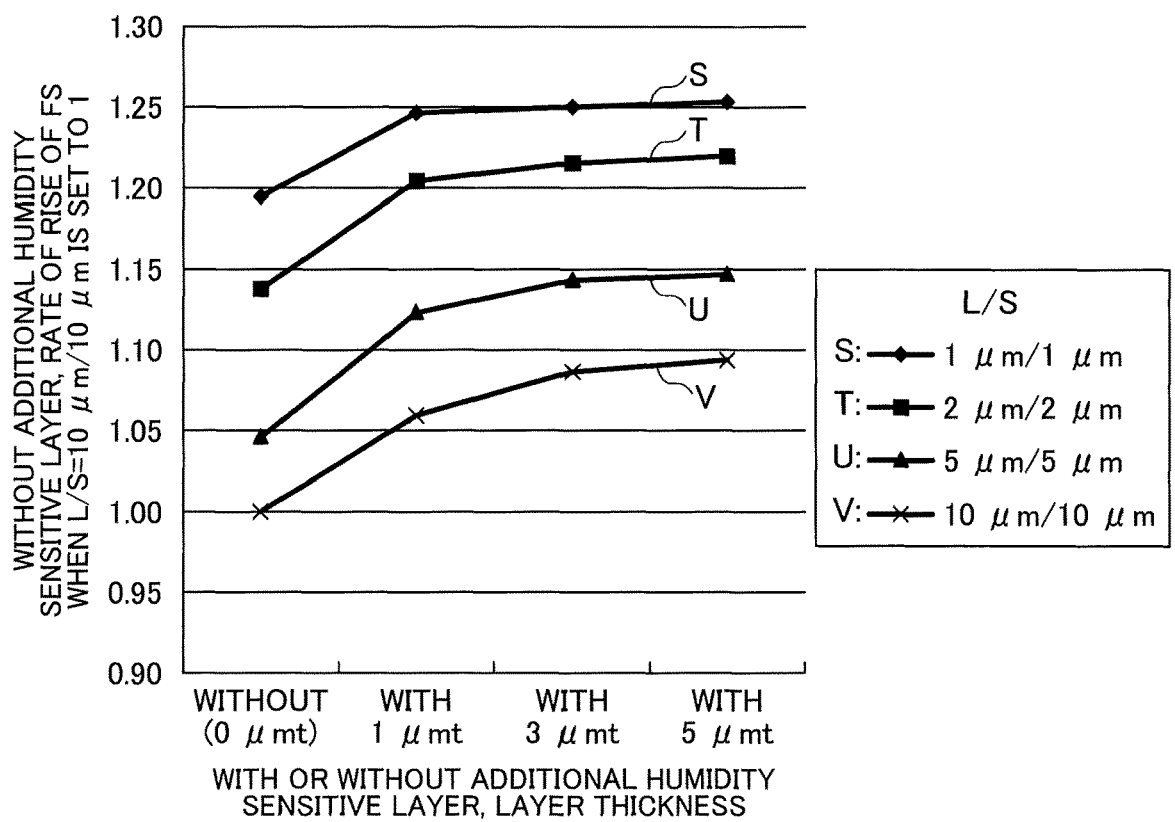
FIG. 14 is a diagram illustrating effects of improving measurement accuracy in the sensor structure of the embodiment.

FIG. 14 is a diagram illustrating effects of improving measurement accuracy in the sensor structure of the embodiment. The larger the FS is, the higher the measurement accuracy becomes. The measurement accuracy is illustrated for various L/S, in the state in which no second moisture sensitive layer 14b is provided, and for cases in which the thickness of the second moisture sensitive layer 14b is varied to 1 μm, 3 μm, and 5 μm. The ordinate indicates the measurement accuracy by a rate of rise of the FS (Full Scale), by regarding FS to be 1 when no second moisture sensitive layer 14b is provided and the L/S [μm/μm] of the upper electrode 15 is 10/10. In FIG. 14, a line S plotted by diamond-shaped marks indicates the rate of rise of FS when the L/S is 1 μm/1 μm, a line T plotted by square-shaped marks indicates the rate of rise of FS when the L/S is 2 μm/2 μm, a line U plotted by triangular marks indicates the rate of rise of FS when the L/S is 5 μm/5 μm, and a line V plotted by cross-shaped marks indicates the rate of rise of FS when the L/S is 10 μm/10 μm.

Even in the state in which no second moisture sensitive layer 14b is provided, the measurement accuracy can be improved to a certain extent by optimizing the L/S of the upper electrode. Particularly, the effect of improving the accuracy may be expected by setting the L/S to 5 μm/5 μm or less. However, in the state in which no second moisture sensitive layer 14b is provided, an abnormal value may be output due to the water adherence, as illustrated in FIG. 12A, FIG. 12B, and FIG. 12C.

By arranging the second moisture sensitive layer 14b, the FS greatly improves, and an abnormal output is prevented, to thereby enable stable output of the measurement result. The measurement accuracy can be improved when the L/S [μm/μm] is in a range of 1/1 to 10/10. In this example, the case in which the L/S is 1/1 corresponds to a structure in which the length of one side of the opening 16 is 1/100 the length of one side of the upper electrode 15. The case in which the L/S is 10/10 corresponds to a structure in which the length of one side of the opening 16 is 1/10 the length of one side of the upper electrode 15. In addition, the case in which the L/S is 10/10 corresponds to the structure in which the area of one opening 16 is $1.0 \times 10^{-2}$ times the area of the upper electrode 15 including the openings 16 (10 μm×10 μm/100 μm×100 μm).

From these simulation results, it may be seen that the stable measurement accuracy can be achieved by arranging the second moisture sensitive layer 14b on the upper electrode 15, and optimizing the pattern of the upper electrode 15, to reduce the effects of the water adherence on the sensor. In addition, even in the case in which the upper electrode 15B having the ladder-like pattern illustrated in FIG. 6B is formed, it may be assumed that similar effects are obtainable by setting the width of the opening 15B along a direction perpendicular to a longitudinal direction of the opening 16B to 1/100 to 1/10 the length of one side of the upper electrode 15B along the same direction.

Next, a humidity sensor including the upper electrode 15 having the lattice-like pattern was manufactured, and experiments were conducted to confirm the effects of the humidity sensor in the first embodiment. The structure of the manufactured humidity sensor is as follows.

Figure 15:
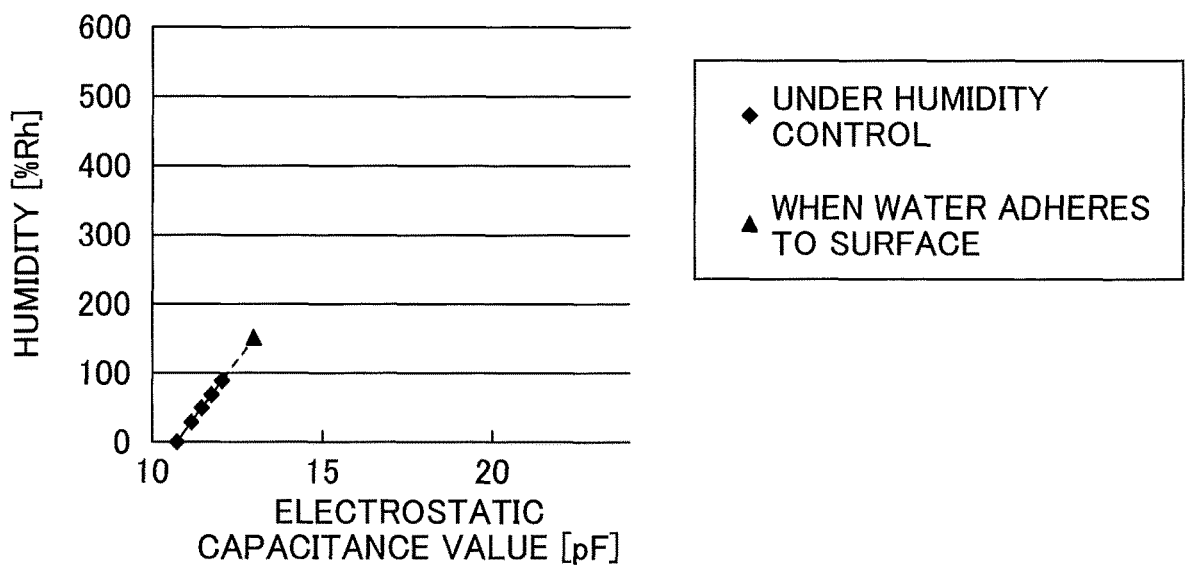
FIG. 15 is a diagram for explaining a relationship between an electrostatic capacitance value and humidity in the humidity sensor of the embodiment.

Outline of lower electrode 13: 700 μm×490 μm
Outline of upper electrode 15: 700 μm×490 μm
The L/S defining lattice-like electrode pattern: 2 μm/2 μm
First moisture sensitive layer 14a: Polyimide having a thickness of 1 μm
Second moisture sensitive layer 14b: Polyimide having a thickness of 2 μm FIG. 15 is a diagram for explaining a relationship between the electrostatic capacitance value and the humidity in the humidity sensor of the embodiment. In FIG. 15, the abscissa indicates the electrostatic capacitance value [pF], and the ordinate indicates the humidity [% Rh]. In addition, in FIG. 15, diamond-shaped marks indicate the relationship between the electrostatic capacitance value and the humidity under humidity control, and triangular marks indicate the relationship between the electrostatic capacitance value and the humidity in the state (high-humidity state+water adherence) in which the water is adhered on the sensor.

As illustrated in FIG. 15, according to the humidity sensor of the embodiment, in the state in which the water is adhered on the sensor, it may be seen that the relative humidity obtained by the conversion using the approximation formula is approximately 150% Rh and close to the value of the relative humidity at the high humidity. This relative humidity (150% Rh) is an extremely small value compared to the relative humidity (690% Rh) obtained by the conversion using the approximation formula in the state in which the water is adhered on the sensor of the comparison example illustrated in FIG. 12C described above. Hence, according to the humidity sensor of the embodiment, it is possible to considerably reduce the effects of the water adherence when compared the humidity sensor of the comparison example.

In addition, from the results of the experiments, it may be seen that the effects of the water adherence is greatly reduced when the area of the upper electrode 15 including the openings 16 is set to 700 μm×490 μm ($3.43×10^5$ μm$^2$), and the L/S is set to 2 μm/2 μm. In this case, the area of one opening 16 is $2.92×10^{-6}$ (2 μm×2 μm/700 μm×490 μm) times the area of the upper electrode 15 including the openings 16. Further, the length of one side of the opening 16 is 1/350 the length of a long side of the upper electrode 15.

As described above, from the simulation results and the results of the experiments, it is confirmed that the measurement accuracy can be improved particularly when the area of one opening 16 is in a range of $2.92×10^{-6}$ to $1.0×10^{-2}$ times the area of the upper electrode 15 including the openings 16.

Second Embodiment

In a second embodiment, an arbitrary sensor element is protected from the drops of water, by providing, on the sensor surface, a water repellent pattern having a shape that makes penetration by the drops of water difficult and also makes removal of the adhered drops of water easy.

Figure 16A:
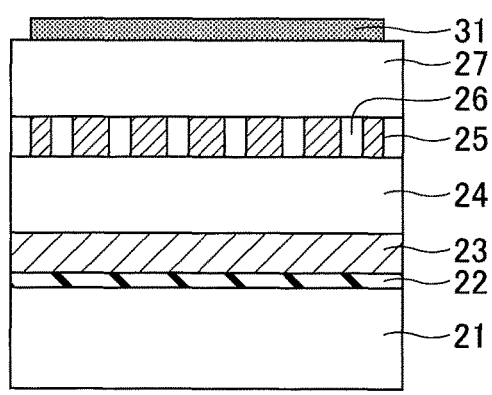
FIG. 16A is a diagram illustrating an example of a structure of a sensor element in a second embodiment.
Figure 16B:
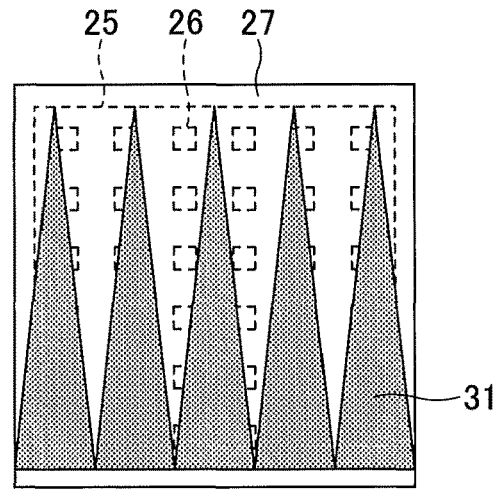
FIG. 16B is a diagram illustrating the example of the structure of the sensor element in the second embodiment.

FIG. 16A and FIG. 16B illustrate an example of the structure of a sensor element 30 in the second embodiment. FIG. 16A is a general cross sectional view, and FIG. 16B is a top view. The sensor element 30 has a stacked structure in which a lower electrode 23, a detection layer 24, an upper electrode 25 on the detection layer 24, a cover layer 27, and a water repellent layer 31 are stacked in this order on a substrate 21 via an insulator layer 22.

The insulator layer 22 is inserted between the substrate 21 and the lower electrode 23 in a case in which a semiconductor substrate made of silicon (Si) or the like is used as the substrate 21. In a case in which an insulating substrate made of magnesium oxide (MgO), sapphire ($Al_2O_3$), or the like is used, the insulator layer 22 may be omitted. The lower electrode 23 is formed by a metal having a good conductivity, such as Al, Cu, Pt, Ni, Ag, Au, Ti, Ta, alloys thereof, or the like, for example.

A different material is used for the detection layer 24, depending on a detection target of the sensor element 30. In the case of the humidity sensor, a polymer moisture sensitive layer made of polyimide, cellulose, PMMA (polymethyl methacrylate), or the like, for example, may be used. In the case of a temperature sensor, a temperature sensitive layer made of thermal expansion ceramics, temperature sensitive paint, or the like may be used. In the case of a gas sensor, a gas sensitive layer made of a gas sensitive material that includes porous metal oxides including tin oxide ($SnO_2$), titanium oxide ($TiO_2$), zinc oxide (ZnO), or the like as a main component, halogen compounds, or the like may be used.

The upper electrode 25 has a predetermined pattern, and includes openings 26 that expose parts of the detection layer 24. It is not essential to provide the cover layer 27, however, from a viewpoint of protecting the upper electrode 25 and the detection layer 24, the cover layer 27 may be arranged to cover the stacked structure of the sensor element 30. In a case in which the sensor element 30 is the humidity sensor, a moisture permeation layer, that blocks the drops of water and passes only the water molecules included in the air, may be used as the cover layer 27. The moisture permeation layer may be made of the same material as the moisture sensitive layer, or may be made of a material different from that of the moisture sensitive layer. The upper electrode 25 and the lower electrode 23 are connected to a measuring device, such as a capacitance meter, an ammeter, or the like, via lead lines (leads) that are not illustrated in FIG. 16A and FIG. 16B.

The water repellent layer 31 is patterned to have a pattern that faces a fixed direction at the surface of the sensor element 30. The water repellent layer 31 itself has a structure that includes a water repellent group, such as a $CF_3$ (trifluoromethyl) group or the like, bonded to a boehmite layer having concavo-convex structure with a pitch of 50 nm to 200 nm, for example. In this embodiment, the water repellent layer 31 has the concavo-convex structure with the pitch of approximately 100 nm. The boehmite is an alumina hydrate represented by a composition AlOOH. A concavo-convex structure having a pitch of 50 nm to 200 nm and made of one of oxides such as HfO, $ZrO_2$, $Y_2O_3$, $SiO_2$, $Nb_2O_5$, $Ta_2O_5$, $Al_2O_3$, $MgF_2$, $LaF_3$, SiON, or the like, nitrides, and oxynitrides may be used in place of the boehmite layer. Alternatively, a layer having a high water repellency, such as a fluorine component layer, a silicone compound layer, or the like may be used as the water repellent layer 31. In FIG. 16B, the tapered water repellent layer 31 extends to a position of an end part of the upper electrode 25 located underneath, however, the tapered water repellent layer 31 may extend further to a vicinity of an edge of the sensor element 30 by exceeding the end part position of the upper electrode 25.

Figure 17:
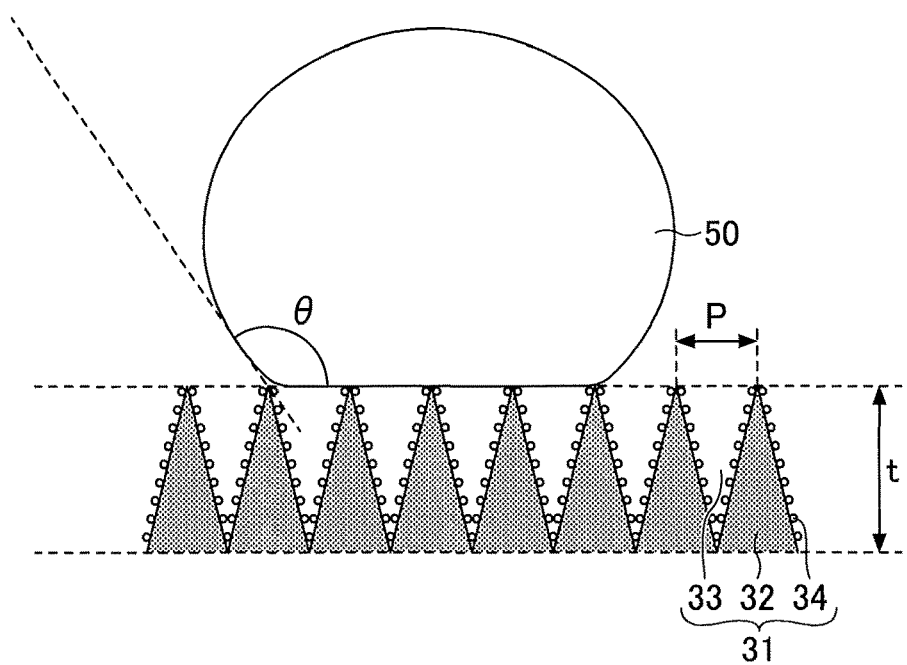
FIG. 17 is a schematic diagram of a water repellent layer used in the second embodiment.

FIG. 17 is a schematic diagram of a cross section of the water repellent layer 31. By forming protrusions 32 and cavities 33 in a base layer of boehmite or the like, the surface area of the base layer is increased, and the water repellent effect is increased by a $CF_3$ group 34 bonded to the surface. A thickness (t) of the water repellent layer 31 is 10 nm to 200 nm. When the thickness is less than 10 nm, the durability of the water repellent layer 31 may become insufficient. In addition, depending on the material used, it may become difficult to form the concavo-convex that exhibits the desired water repellency. When the thickness exceeds 200 nm, the concavo-convex structure is formed on an outermost surface, but the pattern manufacturing process becomes difficult to perform. The concavo-convex having the pitch of 50 nm to 200 nm may be formed in an aluminum thin film having a thickness of 10 nm to 200 nm, by dipping the aluminum thin film in hot water of 80° C. to 100° C. for 15 minutes to 60 minutes. By dipping the aluminum thin film in hot water, aluminum oxide ($Al_2O_3$) at the aluminum surface and the water chemically react and form the boehmite layer and also dissolves into the hot water, to form the microstructure of several tens of nm. By such a concavo-convex structure, the water repellent layer 31 indicates a water repellency with a water contact angle of 120° or larger, and more preferably with a water contact angle of 130° or larger.

As features of the second embodiment, the water repellent layer 31 is patterned to have the pattern that repels the water, enables easy removal of the drops of water adhered thereon, and smoothly passes a component that is the detection target to the detection layer 2 located underneath. More particularly, the water repellent layer 31 partially covers an underlayer (for example, the cover layer 27), and is patterned to have the pattern with a predetermined orientation. The patterning may be performed using the exposure and development of the photolithography technique, to form the pattern having a desired shape. Because the pattern has the orientation, the drops of water are moved in a fixed direction while being aggregated, so that the grown drops of water can easily be ejected to the outside. Further, because a contact area with a solid substance is small, the adhesive force can be weakened, to facilitate spontaneous desorption of the solid substance.

In the example illustrated in FIG. 16B, the water repellent layer 31 has the pattern with tapered tip ends that extend in one direction. The surface of the pattern and the edges forming the tapered shape repel the drops of water, and the drops of water are moved in the direction in which center axes of the tapers extend while being aggregated, to eject the drops of water to the outside. On the other hand, the component (a specific gas component, water molecules, or the like), that is the detection target included in the air, passes through the openings in the cover layer 27 and the upper electrode 25 from between the tapers, and is adsorbed by the detection layer 24. According to this structure, the effects of the drops of water can be reduced, and the high sensing accuracy can be maintained.

Figure 18A:
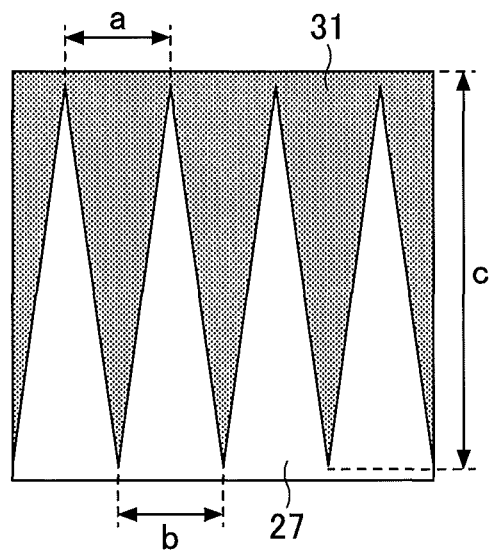
FIG. 18A is a diagram illustrating an example of a water repellent pattern used in the second embodiment.
Figure 18B:
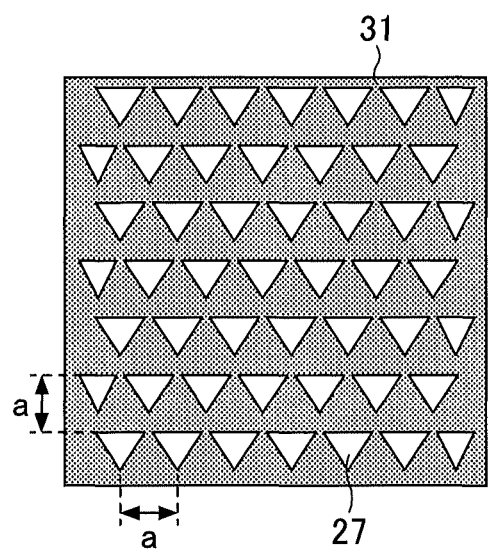
FIG. 18B is a diagram illustrating the example of the water repellent pattern used in the second embodiment.

FIG. 18A, FIG. 18B, FIG. 18C, FIG. 18D, and FIG. 18E illustrate various patterns of the water repellent layer 31. FIG. 18A illustrates a tapered pattern, similar to FIG. 16B, and having an isosceles triangle shape that is long along a height direction. FIG. 18B illustrates a triangle pattern having a large number of triangles facing a fixed direction. The patterns illustrated in FIG. 18A and FIG. 18B, facing a fixed direction of the water repellent layer (having anisotropy), can easily move the drops of water adhered on the surface in the fixed direction.

Figure 18C:
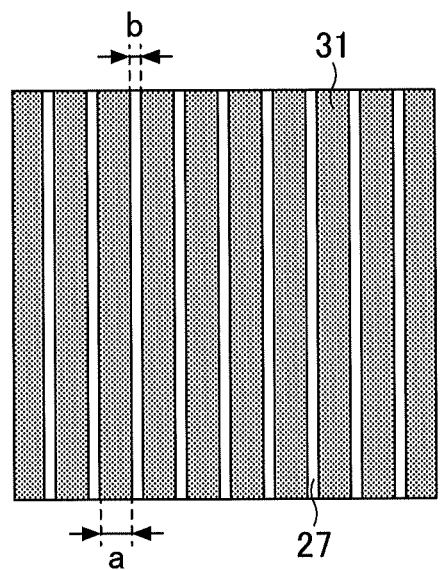
FIG. 18C is a diagram illustrating the example of the water repellent pattern used in the second embodiment.
Figure 18D:
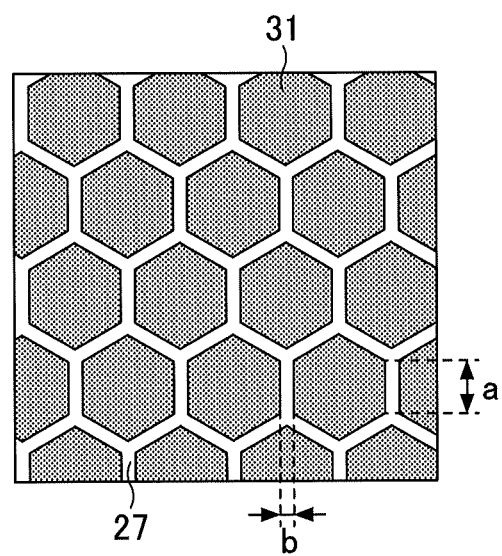
FIG. 18D is a diagram illustrating the example of the water repellent pattern used in the second embodiment.
Figure 18E:
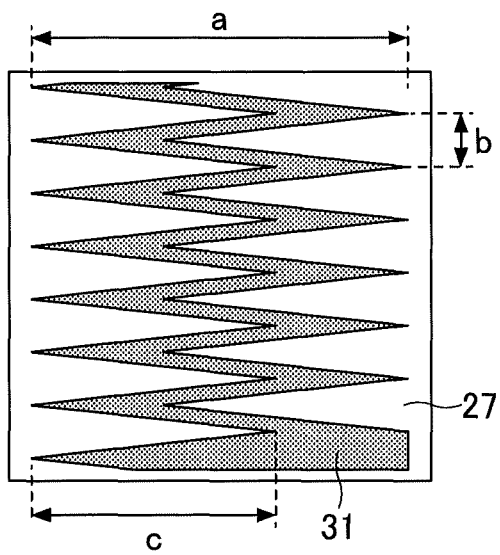
FIG. 18E is a diagram illustrating the example of the water repellent pattern used in the second embodiment.

FIG. 18C illustrates a stripe pattern. According to this pattern, the surface and the edges of the water repellent layer 31 repel the drops of water, and the drops of water are moved along a direction in which the stripe extend while being aggregated. FIG. 18D illustrates a polygonal or a honeycomb-shaped pattern. FIG. 18E illustrates a zigzag pattern. In order to investigate the water repellent effects of the patterns of FIG. 18A through FIG. 18E, samples having the water repellent patterns corresponding to FIG. 18A through FIG. 18E were manufactured, and water repellent states thereof were observed.

Figure 19A:
FIG. 19A is a diagram illustrating a sample and a spray condition for inspecting effects of the water repellent pattern.
Figure 19B:
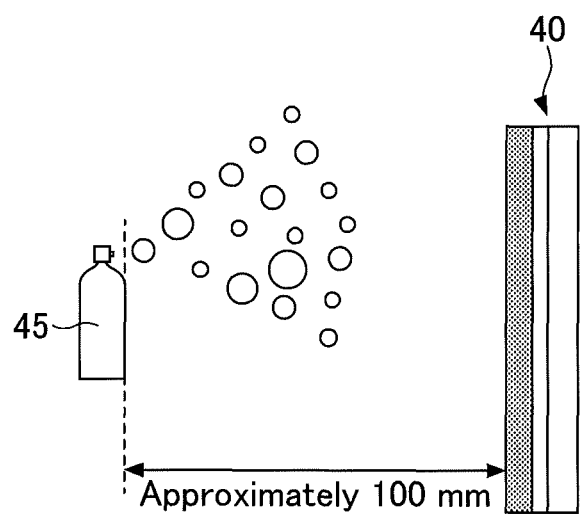
FIG. 19B is a diagram illustrating the sample and the spray condition for inspecting the effects of the water repellent pattern.

FIG. 19A and FIG. 19B are diagrams illustrating a structure and a spray condition of a sample 40 for confirming the water repellent pattern. The sample 40 includes a silicon substrate 41, a moisture sensitive layer 44 on the silicon substrate 41, and the water repellent layer 31 having a predetermined pattern formed on the moisture sensitive layer 44.

The manufactured sample 40 was held at an angle of 90° with respect to a horizontal plane, and drops of water were sprayed using a sprayer 45. In all of the patterns, a spray distance d was 100 m±50 mm, the spraying was performed 5 times, and a diameter of the drops of water was 100 μm to 1000 μm. As an evaluation method, a digital camera TG-4 manufactured by Olympus Corporation was used to capture images in a microscope mode.

FIG. 20 is a diagram illustrating specifications of each of the water repellent patterns, and illustrates a table of structures and dimensions of the water repellent patterns. Patterns A through E correspond to the shapes illustrated in FIG. 18A through FIG. 18E. As the pattern A, four kinds of tapered patterns A-1 through A-4 were formed. Each of the patterns A-1 through A-4 includes isosceles triangles having a height (h) of 800 μm, but a size a of a base of each isosceles triangle of the water repellent layer 31, and a distance (or pitch) b between vertexes of adjacent isosceles triangles are different among the patterns A-1 through A-4.

As the pattern B, five kinds of triangle patterns B-1 through B-5 were formed. Each triangle of the water repellent layer 31 has the base and the height that are both "a", but the value of "a" is made different for each of the patterns B-1 through B-5. The distance (or pitch) b between the vertexes of the adjacent triangles is set to a (a=b) in each of the patterns B-1 through B-5.

As the pattern C, four kinds of stripe patterns C-1 through C-4 were formed. Each stripe of the water repellent layer 31 has a width a that is fixed (a=30 μm), but an interval b between the stripes is made different for each of the patterns C-1 through C-4. As the pattern D, four regular hexagon patterns D-1 through D-4 were formed. Each regular hexagon of the water repellent layer 31 has a length a of one side, and a distance b between adjacent hexagons, that are respectively made different for each of the patterns D-1 through D-4. As the pattern E, one kind of zigzag pattern was formed. The zigzag pattern E has a variation width a of 840 μm, an interval b between adjacent peaks of 120μ, and a notch of 340 μm.

Figure 21A:
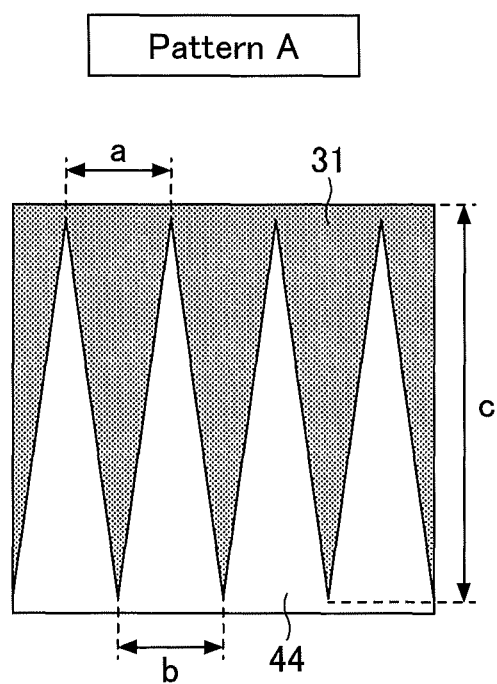
FIG. 21A is an image illustrating a water repellent state of a pattern A.
Figure 21B:
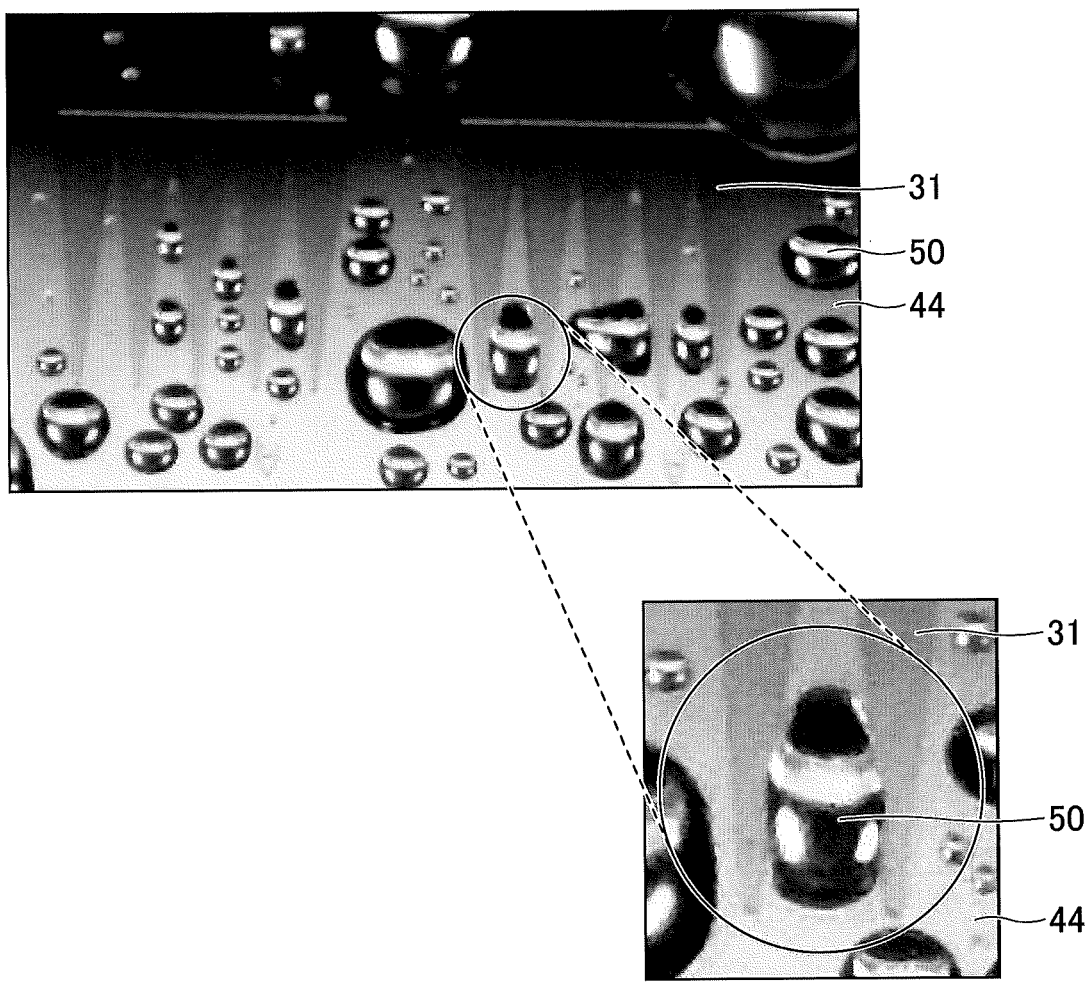
FIG. 21B is an image illustrating the water repellent state of the pattern A.

FIG. 21A and FIG. 21B illustrate observation results of the pattern A-1 of FIG. 20. It may be observed that an amount of drops 50 of water is small in a vicinity of the tapered pattern A-1 of the water repellent layer 31, and that the drops 50 of water are repelled along the patterns. More particularly, the drops 50 of water move towards the vertexes of the tapers while being aggregated. By providing a water drain or the like at the vertexes of the tapered water repellent patterns, it is possible to efficiently eject the drops 50 of water adhered on the water repellent patterns. Further, it may be seen that the drops of water do not adhere onto the moisture sensitive layer 44 exposed between the tapers, and that water vapor (water molecules) included in the air is easily adsorbed on the moisture sensitive layer 44.

Figure 22A:
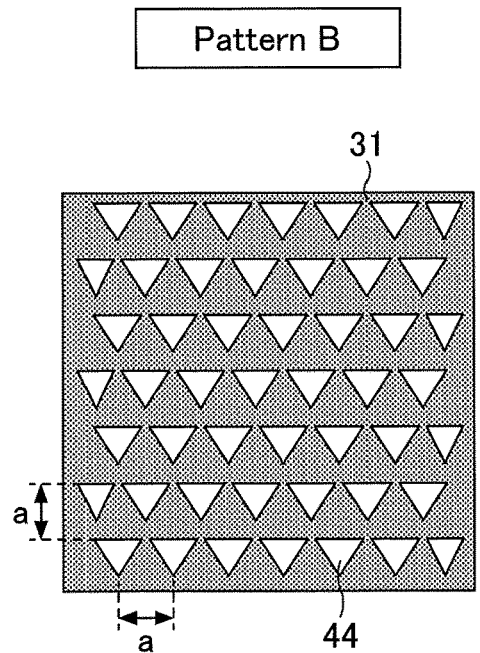
FIG. 22A is an image illustrating a water repellent state of a pattern B.
Figure 22B:
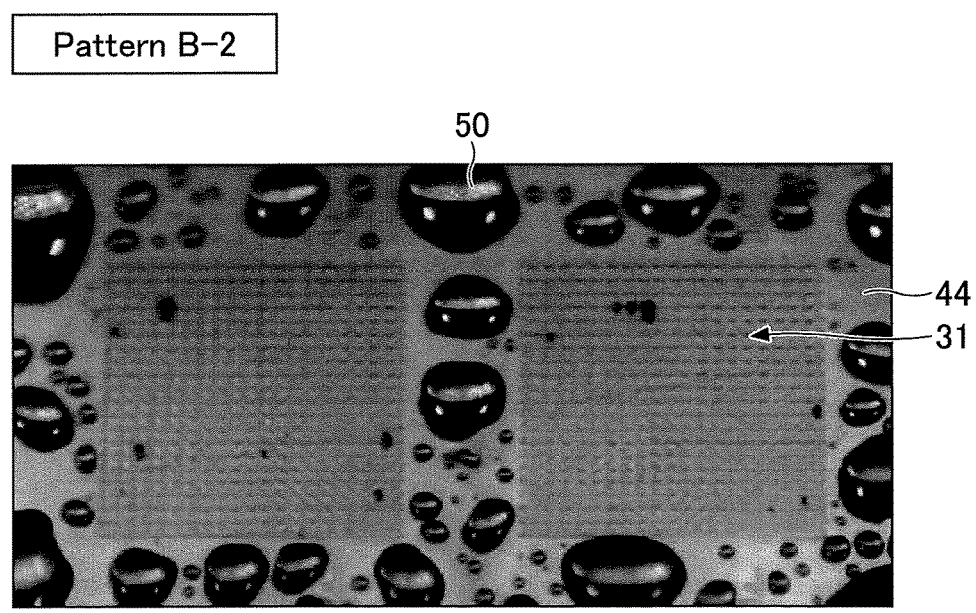
FIG. 22B is an image illustrating the water repellent state of the pattern B.
Figure 22C:
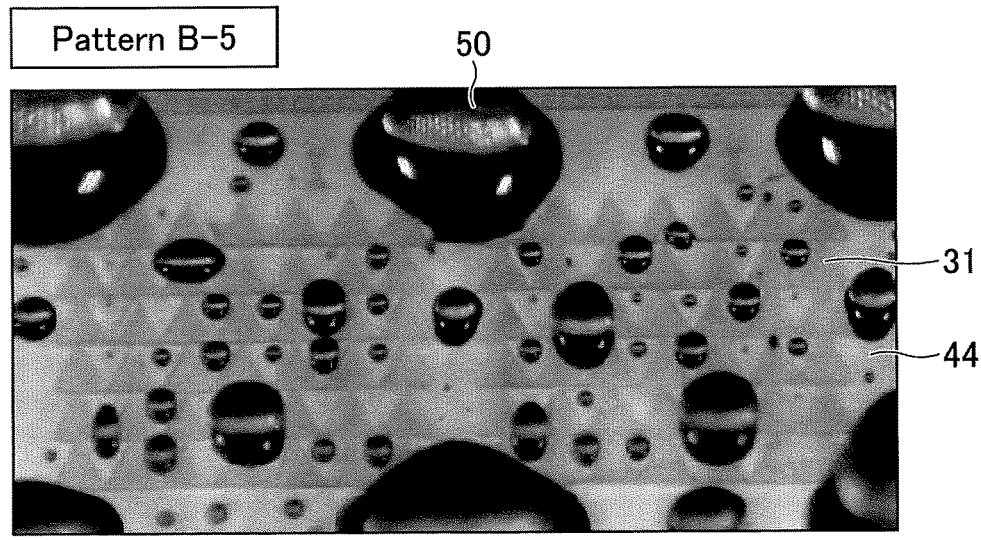
FIG. 22C is an image illustrating the water repellent state of the pattern B.

FIG. 22A, FIG. 22B, and FIG. 22C illustrate the triangle pattern B-2 of the water repellent layer 31, and observation results of the pattern B-5. The pattern B-2 includes triangles that are repetitively arranged, and the triangles are smaller than those of the pattern B-5. In the pattern B-2 having the smaller pattern size, an area ratio of water repellent regions is high compared to that of the pattern B-5 having the larger pattern size, the drops 50 of water uneasily adhere onto the overall pattern B-2, and the water molecules can sufficiently permeate through openings between the adjacent water repellent layers 31. In the pattern B-5, the exposed region between the adjacent triangular water repellent layers 31 is large, and the drops 50 of water repelled by the water repellent layers 31 remain on the exposed humidity sensitive layer 44. The embodiment uses the pattern of the isosceles triangles having the base and the height that are the same, however, it may be assumed that similar results are obtained when the pattern of regular triangles. Hence, when using the pattern of the triangles, satisfactory effects of preventing and removing the drops of water can be obtained by setting one side of the regular triangle or the base and the height of the isosceles triangle in a range of 20 µm to 100 µm, and more preferably in a range of 40 µm to 80 µm.

Figure 23A:
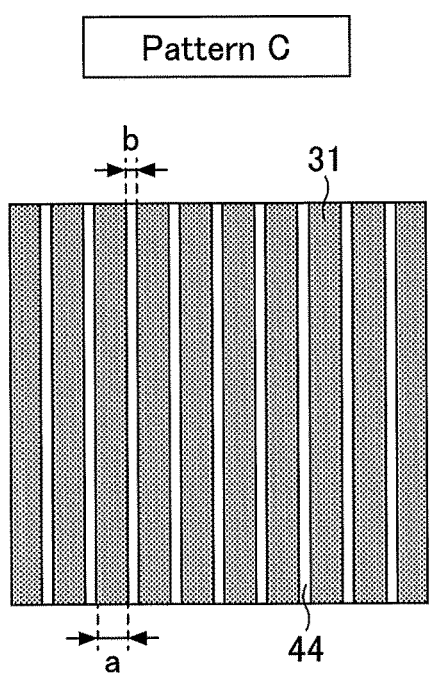
FIG. 23A is an image illustrating a water repellent state of a pattern C.
Figure 23B:
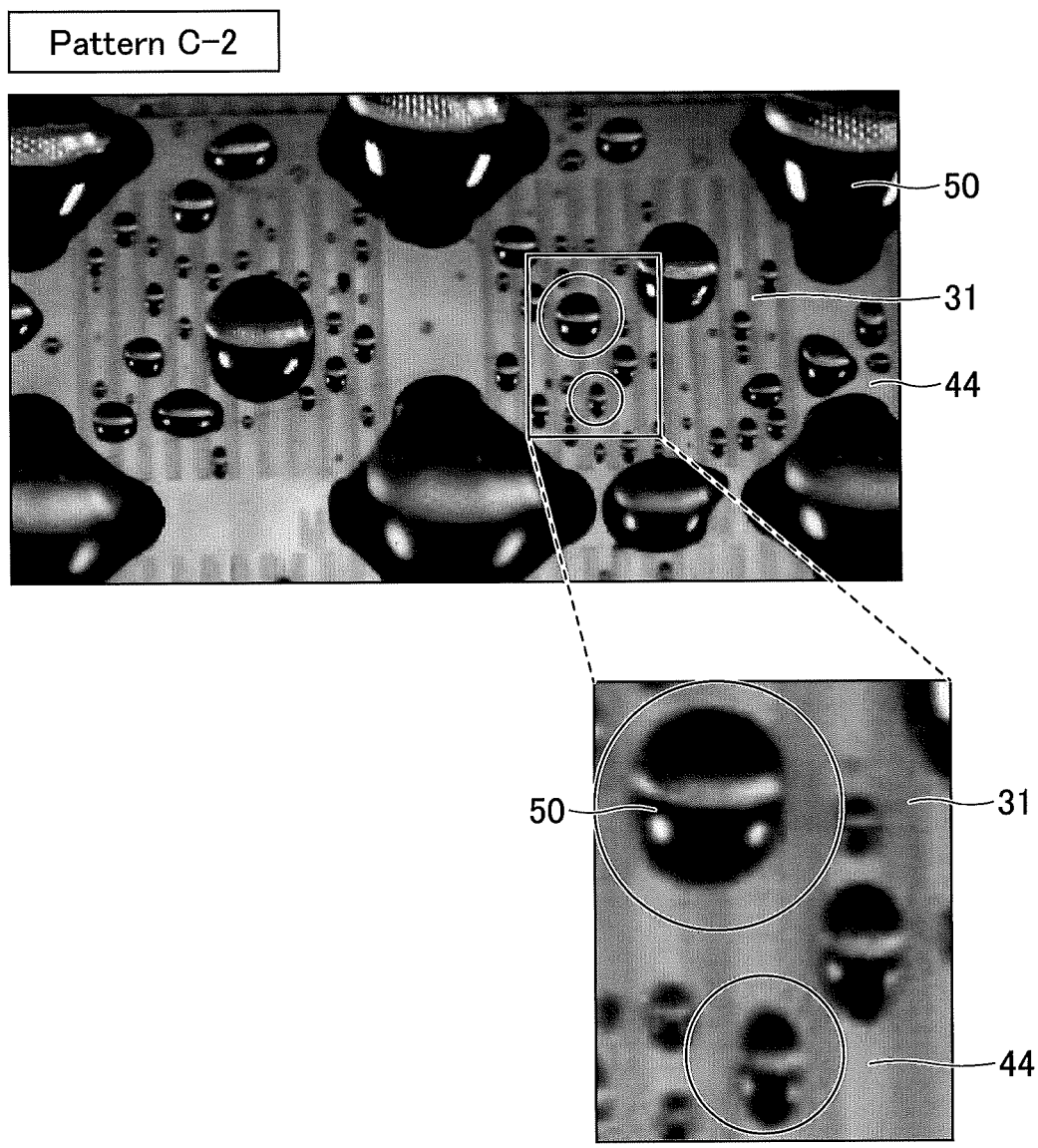
FIG. 23B is an image illustrating the water repellent state of the pattern C.

FIG. 23A and FIG. 23B illustrate observation results of the stripe pattern C-2. The stripe water repellent layer 31 has a width of 30 µm, and an interval between the stripes is 50 µm. The drops 50 of water are repelled along the stripe pattern, however, as the size of the drops 50 of water becomes large, the drops 50 of water may span the patterns and adhere on the entire element.

Figures 24, 25:
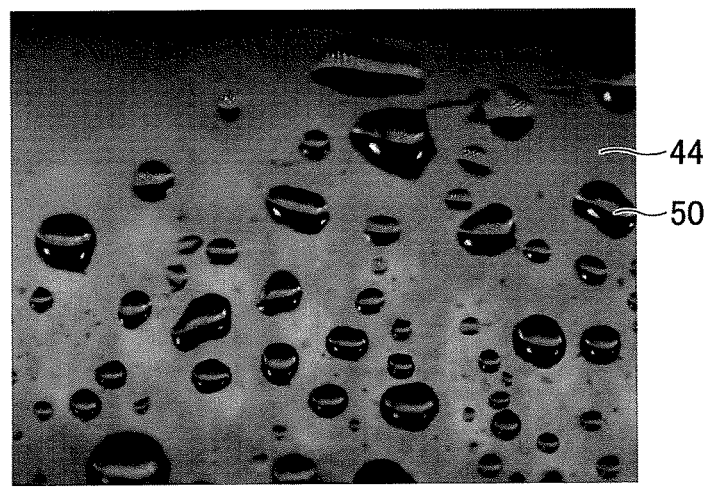
FIG. 24 is an image illustrating an adhesion state of drops of water on a detection layer having no water repellent pattern in the comparison example.
FIG. 25 is a diagram illustrating evaluation results of the water repellent patterns of the embodiment.

FIG. 24 illustrates, as a comparison example, an observation image of a sample in which no water repellent pattern is provided and the entire moisture sensitive layer 44 is exposed. The drops 50 of water adhere at random on the entire surface when only the moisture sensitive layer 44 is provided and no water repellent pattern is provided.

FIG. 25 illustrates evaluation results based on FIG. 21 through FIG. 24. The water adhesion resistance is evaluated from digital microscope images, with respect to the patterns A-1, B-2, B-5, and C-2 of the water repellent layer 31 and the comparison example of FIG. 24. The drops of water uneasily adhere on the tapered pattern A-1 and the pattern B-2 of small triangles, and these patterns have a satisfactory effect of preventing drops of water and a satisfactory effect of removing drops of water. The drops of water partially adhere on the pattern B-5 of large triangles and the stripe pattern C-2, but a satisfactory effect of preventing drops of water and a satisfactory effect of removing drops of water can be expected when compared to the comparison example.

From the above results, it is confirmed that, by arranging the water repellent pattern having the orientation on the outermost surface of the sensor element, the drops of water uneasily adhere onto he sensor, and the drops of water adhered on the sensor can easily be removed by moving the drops of water along the pattern. By providing the water repellent pattern, the measurement accuracy can be maintained even under a condensation environment. In addition, by reducing the adherence of the drops of water, it is possible to obtain the effect of preventing contamination due to scale or the like, to improve the durability.

It is possible to combine the water repellent pattern of the second embodiment to the humidity sensor 10 and/or the humidity sensor 20 in the first embodiment. In this case, it is possible to further reduce the effects of the drops of water with respect to the humidity sensor.

Third Embodiment

In a third embodiment, an example of the sensor device including the humidity sensor described above will be described. The sensor device including the humidity sensor in this embodiment may be used by setting up the sensor device at various locations where the humidity is to be detected. The sensor device is particularly suited for use when setting up the sensor device at a location where the condensation easily occurs or at a location where the drops of water easily adhere, such as for farming use or the like inside greenhouses or the like, for example.

Figure 26:
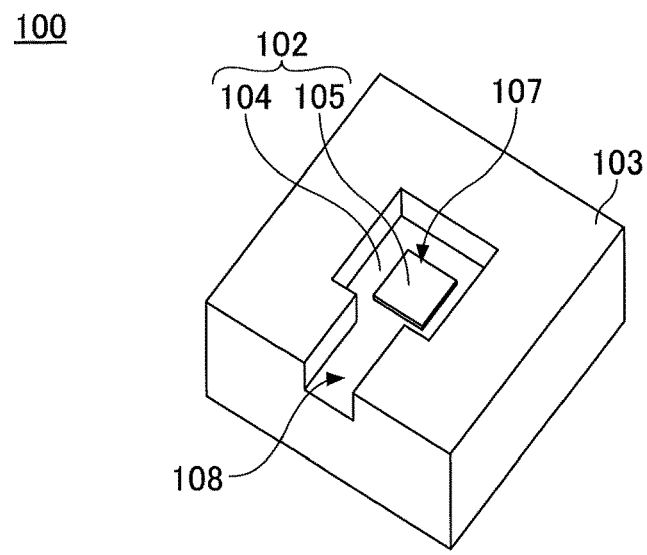
FIG. 26 is a diagram (1) for explaining an example of a sensor device.
Figure 27A:
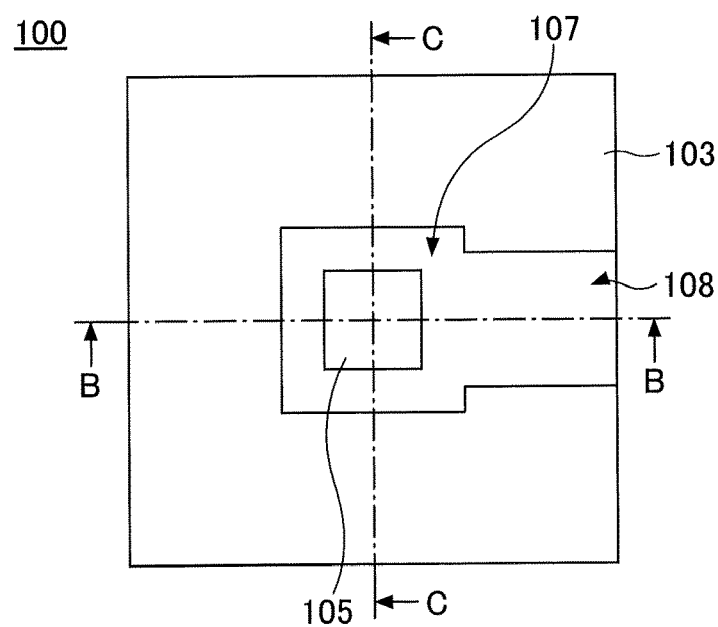
FIG. 27A is a diagram (2) for explaining the example of the sensor device.
Figure 27B:
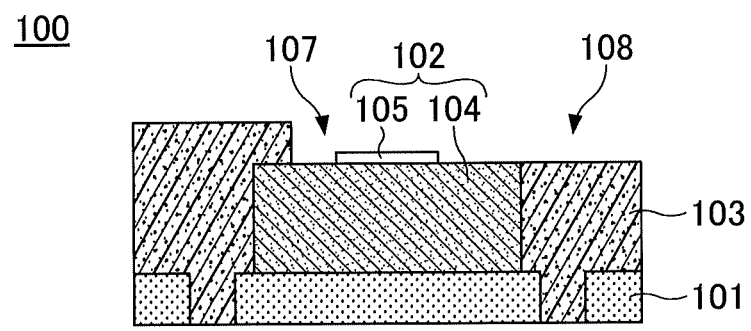
FIG. 27B is a diagram (2) for explaining the example of the sensor device.
Figure 27C:
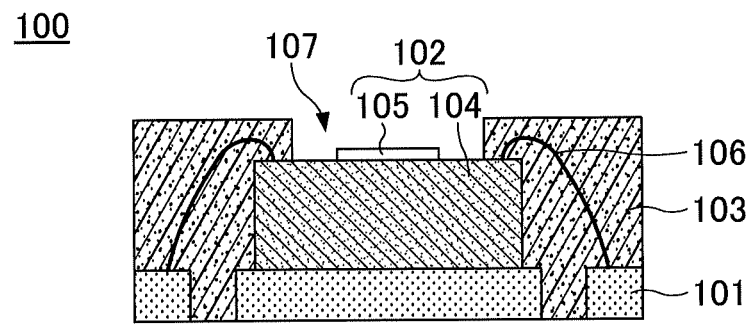
FIG. 27C is a diagram (2) for explaining the example of the sensor device.

FIG. 26, FIG. 27A, FIG. 27B, and FIG. 27C are diagrams for explaining an example of the sensor device. FIG. 26 is a perspective view of the sensor device. FIG. 27A is a top view of the sensor device of FIG. 26, FIG. 27B illustrates a cross section cut along a one-dot chain line B-B in FIG. 27A, and FIG. 27C illustrates a cross section cut along a one-dot chain line C-C in FIG. 27A.

As illustrated in FIG. 26, FIG. 27A, FIG. 27B, and FIG. 27C, the sensor device 100 includes a substrate 101, a humidity sensor 102, and a resin 103.

The substrate 101 is used to mount the humidity sensor 102, and may be a PCB (Printed Circuit Board), for example. The substrate 101 may be mounted with a single humidity sensor 102, or may be mounted with a plurality of humidity sensors 102. Alternatively, the substrate 101 may have a structure in which a plurality of humidity sensors 102 are simultaneously embedded. In addition to the humidity sensor 102, other kinds of detection elements such as an element that detects the temperature or the like, for example, a heater for heating, and an IC (Integrated Circuit) substrate, may be mounted on the substrate 101. FIG. 26, FIG. 27A, FIG. 27B, and FIG. 27C illustrate a case in which one humidity sensor 102 is mounted on the substrate 101. The substrate 101 may have a thickness of 200 µm, for example.

The humidity sensor 102 is mounted on the substrate 101, and includes a silicon substrate 104 and a moisture sensitive part 105. The silicon substrate 104 may have a thickness of 300 µm, for example. The moisture sensitive part 105 is formed by a moisture sensitive layer, having a dielectric constant that varies according to the humidity, for example, sandwiched between an upper electrode and a lower electrode. The upper electrode and the lower electrode are respectively electrically connected to electrodes formed on the substrate 101 by wire bonding using gold wires 106. In addition, the upper electrode and the lower electrode may be respectively electrically connected to the electrodes formed on the substrate 101 by TAB (Tape Automated Bonding) or FCB (Flip Chip Bonding), for example. In FIG. 26, FIG. 27A, FIG. 27B, and FIG. 27C, the moisture sensitive layer 105 has a square shape in the top view, and the illustration of a moisture sensitive layer forming the moisture sensitive part 105, the upper electrode, the lower electrode, and the electrodes formed on the substrate 101 is omitted.

The resin 103 is formed to cover the humidity sensor 102. More particularly, the resin 103 is formed to cover an upper surface of the substrate 101, side surfaces of the humidity sensor 102, and a part of an upper surface of the humidity sensor 102. The resin 103 includes an opening 107, and a groove part 108. The resin 103 may include a certain concentration of a filler.

The opening 107 is provided to expose the moisture sensitive part 105 of the humidity sensor 102. Because an upper surface of the moisture sensitive part 105 is exposed within the opening 107, the dielectric constant of the moisture sensitive layer varies when the moisture is adsorbed and desorbed by the moisture sensitive layer at the opening 107. By measuring a change in the dielectric constant of the moisture sensitive layer, that is, a change in the electrostatic capacitance between the upper electrode and the lower electrode, it is possible to detect the humidity at the location where the sensor device 100 is mounted. The opening 107 has a square shape in the top view. The opening 107 may have a depth of 50 μm, for example.

The groove part 108 communicates to the opening 107 and reaches an outer surface of the resin 103. A height of a bottom surface of the groove part 108 is less than or equal to a height of the upper surface of the moisture sensitive part 105 of the humidity sensor 102. Accordingly, even in a case in which the drops of water are accumulated on the upper surface of the exposed moisture sensitive part 105 of the humidity sensor 102, the drops of water adhered on the upper surface of the moisture sensitive part 105 are ejected from the opening 107 through the groove part 108 in a direction towards the outer surface of the resin 103. For this reason, it is possible to easily eject the drops of water adhered on the upper surface of the moisture sensitive part 105. The groove part 108 has a rectangular shape in the top view. The groove part 108 may have a depth of 50 μm, for example. As illustrated in FIG. 26, the opening 107 and the groove part 108 are formed to be surrounded by a vertical sidewall, however, the sidewall is preferably a gradual sloping surface so that the drops of water may be more easily ejected.

In addition, the bottom surface of the groove part 108 preferably has a hydrophilicity higher than that of the upper surface of the moisture sensitive part 105 of the humidity sensor 102. In this case, compared to a case in which the hydrophilicity of the bottom surface of the groove part 108 and the hydrophilicity of the upper surface of the moisture sensitive part 105 are the same, the drops of water adhered on the upper surface of the moisture sensitive part 105 move more easily, thereby making it easier to eject the drops of water adhered on the upper surface of the moisture sensitive part 105 in the direction towards the outer surface of the resin 103.

(Modification 1)

Figure 28A:
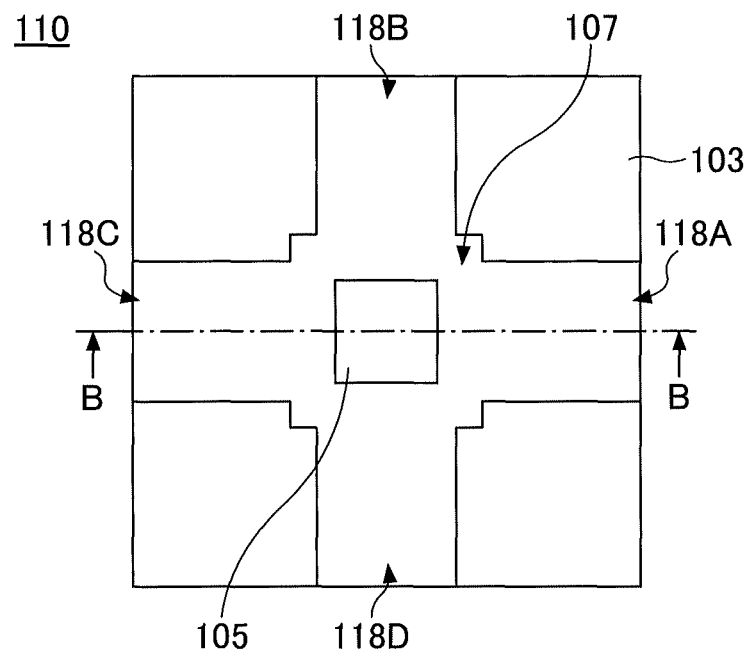
FIG. 28A is a diagram for explaining a sensor in a modification 1.
Figure 28B:
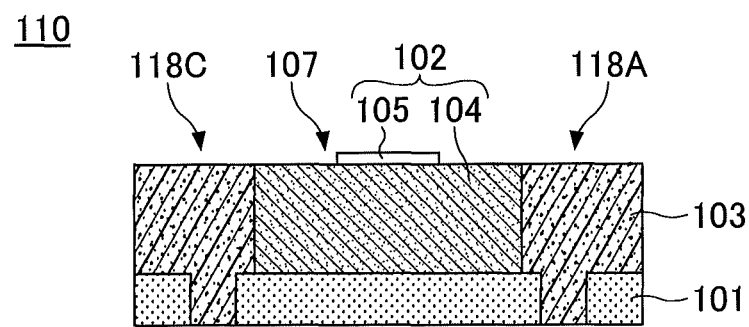
FIG. 28B is a diagram for explaining the sensor device in the modification 1.

A modification 1 of the sensor device will be described. FIG. 28A and FIG. 28B are diagrams for explaining the sensor device in the modification 1. FIG. 28A is a top view of the sensor device, and FIG. 28B illustrates a cross section cut along a one-dot chain line B-B in FIG. 28A.

As illustrated in FIG. 28A and FIG. 28B, a sensor device 110 in the modification 1 includes four groove parts 118A, 118B, 118C, and 118D formed on an upper surface of the resin.

The four groove parts 118A, 118B, 118C, and 118D respectively have a rectangular shape in the top view, and are formed to extend from the opening 107 to each side of the resin 103. In addition, the groove part 118A and the groove part 118C are formed at positions opposing each other via the opening 107, and the groove part 118B and the groove part 118D are formed at positions opposing each other via the opening 107. Hence, the drops of water adhered on the upper surface of the moisture sensitive part 105 can easily be ejected, regardless of the direction in which the sensor device 110 is set up.

Other constituent elements may be similar to those of the sensor device 100 illustrated in FIG. 26, FIG. 27A, FIGS. 27B, and 27C, and a description thereof will be omitted.

(Modification 2)

Figure 29A:
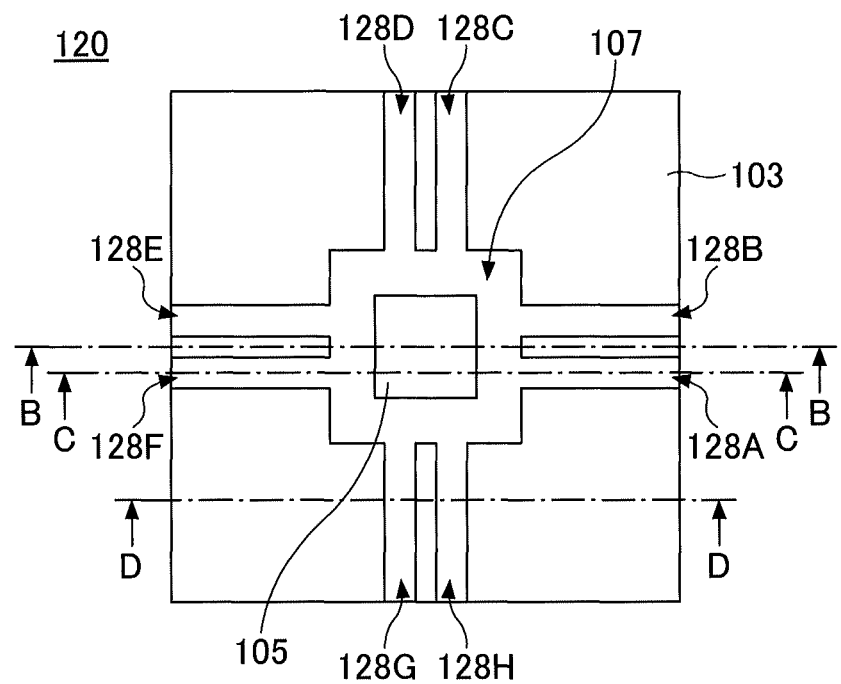
FIG. 29A is a diagram for explaining the sensor device in a modification 2.
Figure 29B:
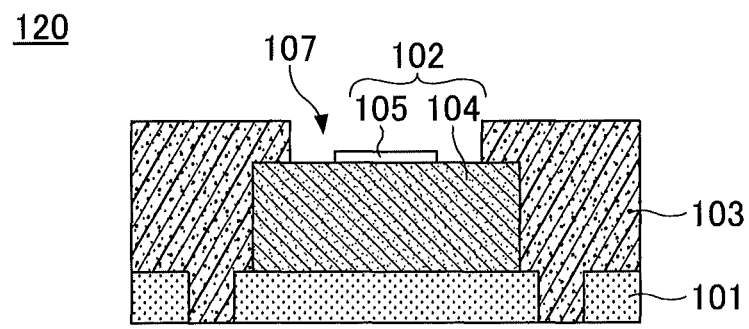
FIG. 29B is a diagram for explaining the sensor device in the modification 2.
Figure 29C:
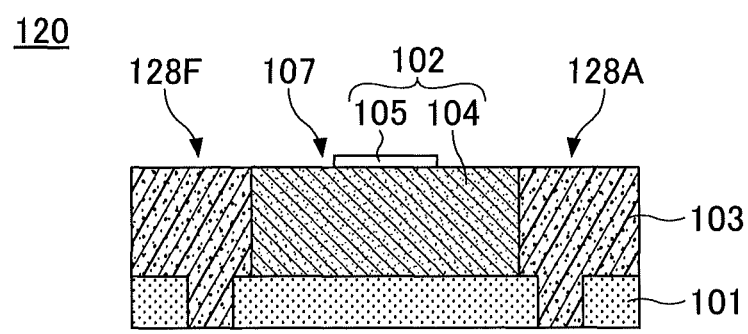
FIG. 29C is a diagram for explaining the sensor device in the modification 2.
Figure 29D:
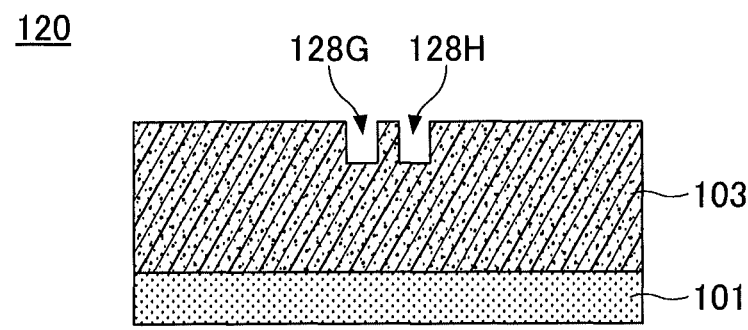
FIG. 29D is a diagram for explaining the sensor device in the modification 2.

A modification 2 of the sensor device will be described. FIG. 29A, FIG. 29B, FIG. 29C, and FIG. 29D are diagrams for explaining the sensor device in the modification 2. FIG. 29A is a top view of the sensor device, and FIG. 29B, FIG. 29C, and FIG. 29D illustrate cross sections respectively cut along a one-dot chain line B-B, a one-dot chain line C-C, and a one-dot chain line D-D in FIG. 29A.

As illustrated in FIG. 29A, FIG. 29B, FIG. 29C, and FIG. 29D, a sensor device 120 in the modification 2 includes eight groove parts 128A, 128B, 128C, 128D, 128E, 128F, 128G, and 128H formed on the upper surface of the resin 103.

The eight groove parts 128A, 128B, 128C, 128D, 128E, 128F, 128G, and 128H respectively have a rectangular shape in the top view, and are formed to extend from the opening 107 to each side of the resin 103. In addition, the groove part 128A and the groove part 128F, the groove part 128B and the groove part 128E, the groove part 128C and the groove part 128H, and the groove part 128D and the groove part 128G are respectively formed at positions opposing each other via the opening 107. Hence, the drops of water adhered on the upper surface of the moisture sensitive part 105 can easily be ejected, regardless of the direction in which the sensor device 120 is set up.

In addition, a width of each of the eight groove parts 128A, 128B, 128C, 128D, 128E, 128F, 128G, and 128H is narrower than the width of the groove part 108 of the sensor device 100 illustrated in FIG. 26, FIG. 27A, FIG. 27B, and FIG. 27C. Hence, small drops of water adhered on the upper surface of the moisture sensitive part 105 can easily be ejected.

Other constituent elements may be similar to those of the sensor device 100 illustrated in FIG. 26, FIG. 27A, FIGS. 27B, and 27C, and a description thereof will be omitted.

(Modification 3)

Figure 30A:
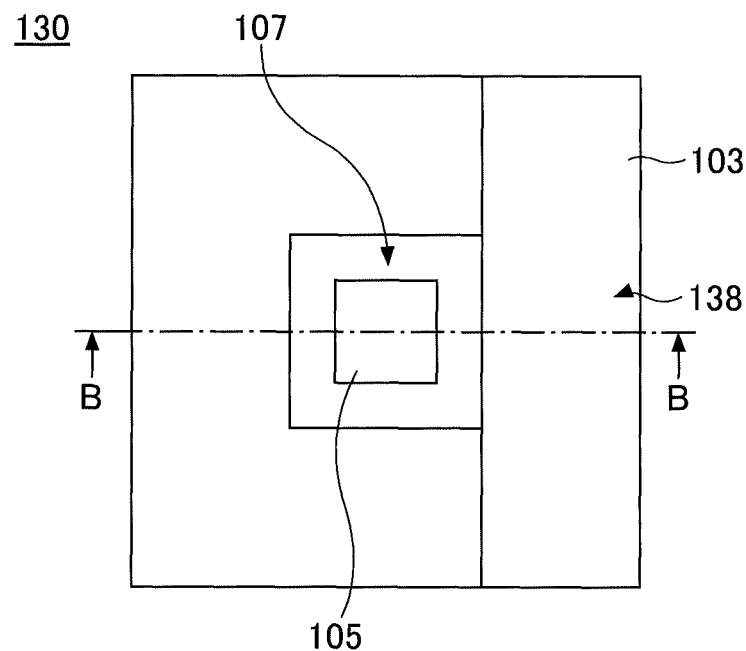
FIG. 30A is a diagram for explaining the sensor device in a modification 3.
Figure 30B:
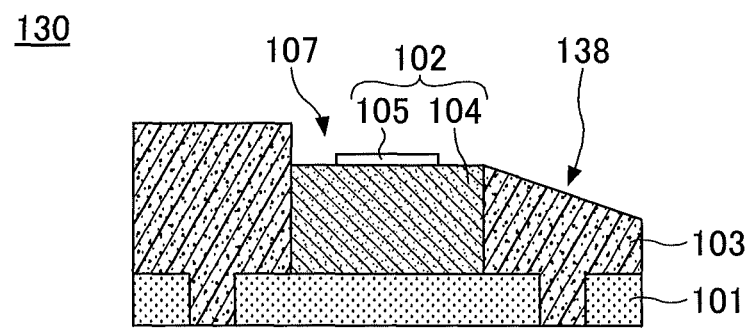
FIG. 30B is a diagram for explaining the sensor device in the modification 3.

A modification 3 of the sensor device will be described. FIG. 30A and FIG. 30B are diagrams for explaining the sensor device in the modification 3. FIG. 30A is a top view of the sensor device, and FIG. 30B illustrates a cross section cut along a one-dot chain line B-B in FIG. 30A.

As illustrated in FIG. 30A and FIG. 30B, a sensor device 130 in the modification 3 includes a groove part 138 having a bottom surface that is inclined, so that the height of the bottom surface decreases from the opening 107 towards the outer surface of the resin 103. Hence, the drops of water adhered on the upper surface of the moisture sensitive part 105 move on the bottom surface of the groove part 138 with a momentum, and the drops of water adhered on the upper surface of the moisture sensitive part 105 can easily be ejected.

Other constituent elements may be similar to those of the sensor device 100 illustrated in FIG. 26, FIG. 27A, FIGS. 27B, and 27C, and a description thereof will be omitted.

(Modification 4)

Figure 31A:
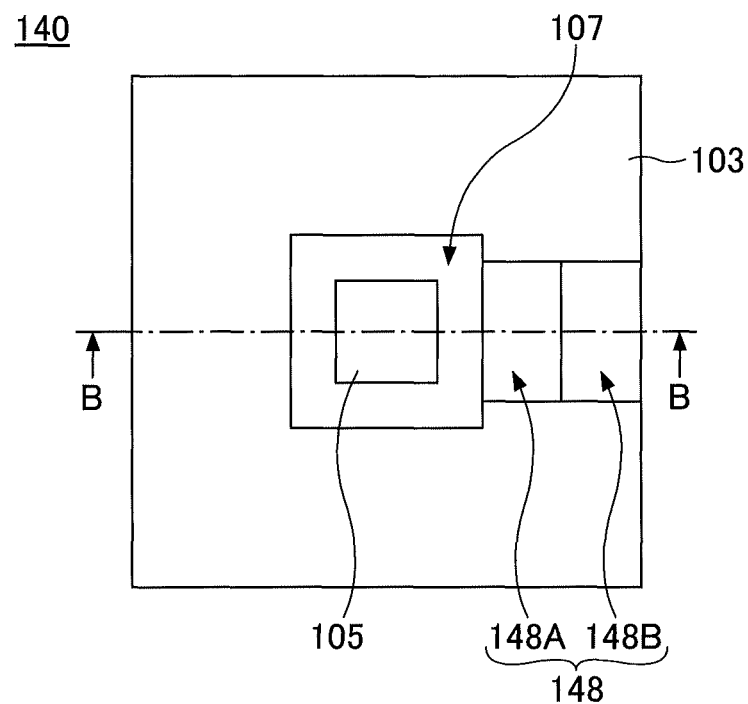
FIG. 31A is a diagram for explaining the sensor device in a modification 4.
Figure 31B:
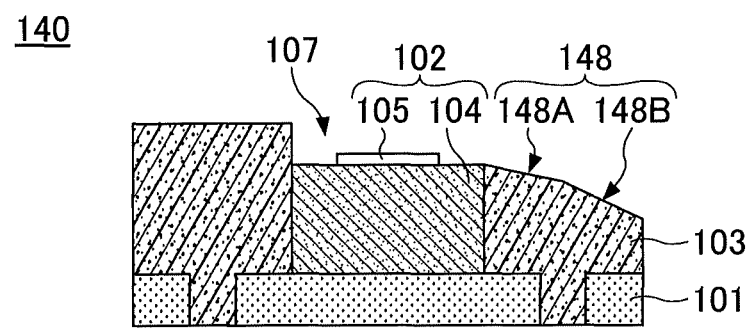
FIG. 31B is a diagram for explaining the sensor device in the modification 4.

A modification 4 of the sensor device will be described. FIG. 31A and FIG. 31B are diagrams for explaining the sensor device in the modification 4. FIG. 31A is a top view of the sensor device, and FIG. 31B illustrates a cross section cut along a one-dot chain line B-B in FIG. 31A.

As illustrated in FIG. 31A and FIG. 31B, a sensor device 140 in the modification 4 includes a groove part 148 having a bottom surface that is inclined in two steps, so that the height of the bottom surface decreases from the opening 107 towards the outer surface of the resin 103. That is, the groove part 148 includes a first groove part 148A communicating with the opening 107, and a second groove part 148B communicating with the first groove part 148A and extending to the outer surface of the resin 103. The first groove part 148A has a first inclination. The second groove part 138B has a second inclination larger than the first inclination. Hence, the drops of water adhered on the upper surface of the moisture sensitive part 105 moves on the bottom surface of the groove part 148 with more momentum when compared to the modification 3, and thus, the drops of water adhered on the upper surface of the moisture sensitive part 105 can easily be ejected.

Other constituent elements may be similar to those of the sensor device 100 illustrated in FIG. 26, FIG. 27A, FIGS. 27B, and 27C, and a description thereof will be omitted.

(Modification 5)

Figure 32A:
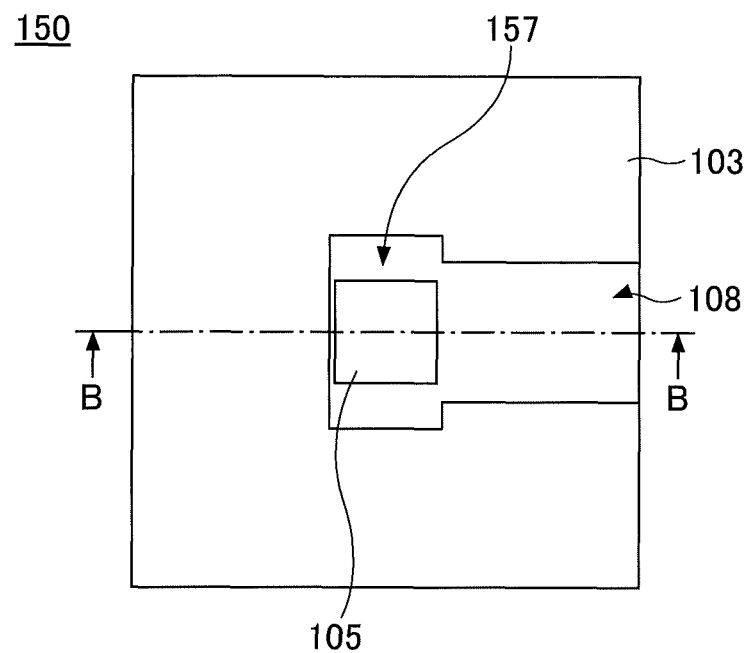
FIG. 32A is a diagram for explaining the sensor device in a modification 5.
Figure 32B:
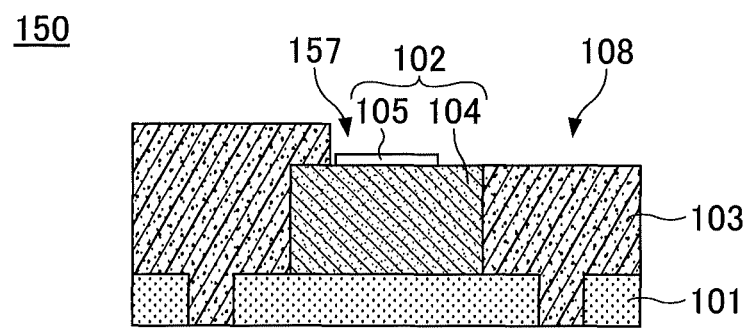
FIG. 32B is a diagram for explaining the sensor device in the modification 5.

A modification 5 of the sensor device will be described. FIG. 32A and FIG. 32B are diagrams for explaining the sensor device in the modification 5. FIG. 32A is a top view of the sensor device, and FIG. 32B illustrates a cross section cut along a one-dot chain line B-B in FIG. 32A.

As illustrated in FIG. 32A, in a sensor device 150 in the modification 5, an opening 157 has a rectangular shape in the top view.

In this case, similarly as in the case of the sensor device 150 having the opening 107 that has the square shape in the top view as illustrated in FIG. 26, FIG. 27A, FIG. 27B, and FIG. 27C, the drops of water adhered on the upper surface of the moisture sensitive part 105 are ejected from the opening 157 through the groove part 108 in the direction towards the outer surface of the resin 103. For this reason, it is possible to easily eject the drops of water adhered on the upper surface of the moisture sensitive part 105.

Other constituent elements may be similar to those of the sensor device 100 illustrated in FIG. 26, FIG. 27A, FIGS. 27B, and 27C, and a description thereof will be omitted.

(Modification 6)

Figure 33A:
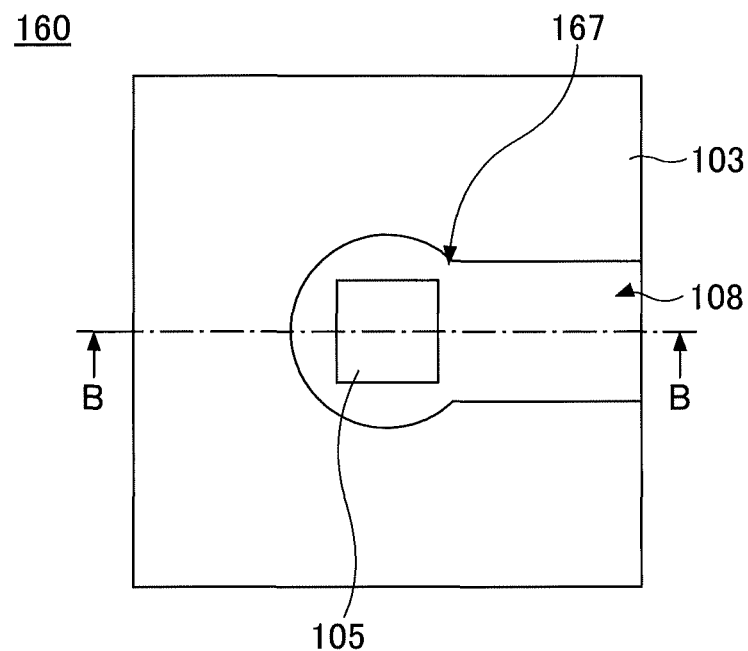
FIG. 33A is a diagram for explaining the sensor device in a modification 6.
Figure 33B:
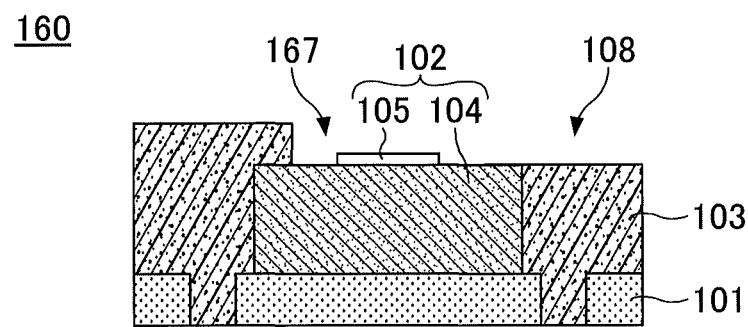
FIG. 33B is a diagram for explaining the sensor device in the modification 6.

A modification 6 of the sensor device will be described. FIG. 33A and FIG. 33B are diagrams for explaining the sensor device in the modification 6. FIG. 33A is a top view of the sensor device, and FIG. 33B illustrates a cross section cut along a one-dot chain line B-B in FIG. 33A.

As illustrated in FIG. 33A, in a sensor device 160 in the modification 6, an opening 167 has a circular shape in the top view.

In this case, similarly as in the case of the sensor device 150 having the opening 107 that has the square shape in the top view as illustrated in FIG. 26, FIG. 27A, FIG. 27B, and FIG. 27C, the drops of water adhered on the upper surface of the moisture sensitive part 105 are ejected from the opening 167 through the groove part 108 in the direction towards the outer surface of the resin 103. For this reason, it is possible to easily eject the drops of water adhered on the upper surface of the moisture sensitive part 105.

Other constituent elements may be similar to those of the sensor device 100 illustrated in FIG. 26, FIG. 27A, FIGS. 27B, and 27C, and a description thereof will be omitted.

(Modification 7)

Figure 34A:
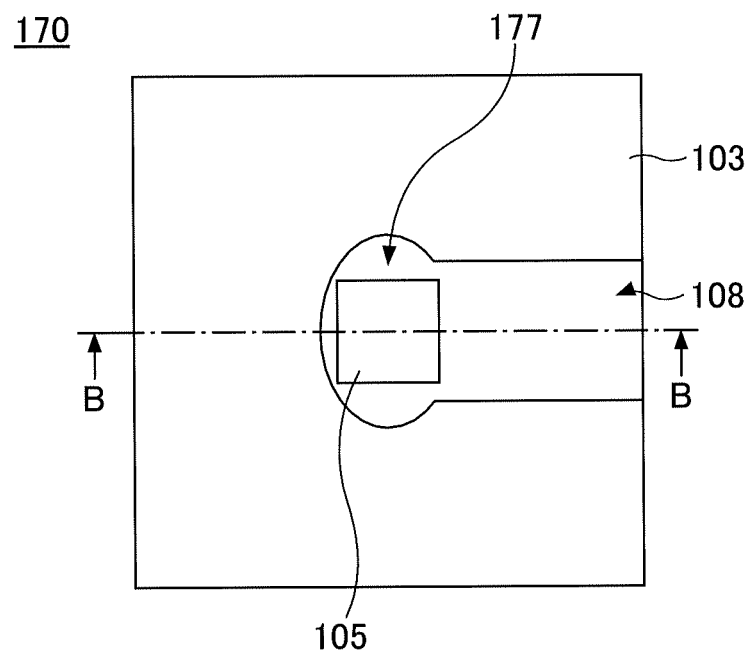
FIG. 34A is a diagram for explaining the sensor device in a modification 7.
Figure 34B:
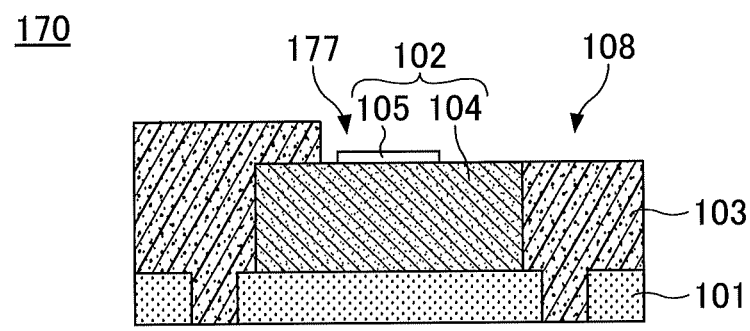
FIG. 34B is a diagram for explaining the sensor device in the modification 7.

A modification 7 of the sensor device will be described. FIG. 34A and FIG. 34B are diagrams for explaining the sensor device in the modification 7. FIG. 34A is a top view of the sensor device, and FIG. 34B illustrates a cross section cut along a one-dot chain line B-B in FIG. 34A.

As illustrated in FIG. 34A, in a sensor device 170 in the modification 7, an opening 177 has an oval shape in the top view.

In this case, similarly as in the case of the sensor device 150 having the opening 107 that has the square shape in the top view as illustrated in FIG. 26, FIG. 27A, FIG. 27B, and FIG. 27C, the drops of water adhered on the upper surface of the moisture sensitive part 105 are ejected from the opening 177 through the groove part 108 in the direction towards the outer surface of the resin 103. For this reason, it is possible to easily eject the drops of water adhered on the upper surface of the moisture sensitive part 105.

Other constituent elements may be similar to those of the sensor device 100 illustrated in FIG. 26, FIG. 27A, FIGS. 27B, and 27C, and a description thereof will be omitted.

(Method of Manufacturing Sensor Device)

Next, a method of manufacturing the sensor device including the humidity sensor will be described for an example in which the sensor device 130 in the modification 3 is manufactured.

First, a surface protection material, such as a polyimide tape or the like, is adhered on the upper surface of the humidity sensor 102 that is mounted on the substrate 101. In this case, the surface protection material is adhered so as to cover the moisture sensitive part 105 of the humidity sensor 102. The position and shape of the surface protection material may be determined according to the position and shape of the opening 107 that is formed. For example, when forming the square opening 107 at the center part of the substrate 101, a square surface protection material may be adhered to the center part of the substrate 101. A thickness of the surface protection material determines the depth of the opening 107 that is formed, and may be 50 µm, for example.

Next, the resin 103 is used to perform a molding, so as to cover the upper surface of the substrate 101, the side surfaces of the humidity sensor 102, the upper surface of the humidity sensor 102, and an upper surface of the surface protection material. Hence, the sensor device 103 having the square shape in the top view is formed.

Next, using a polishing machine, the resin 103 is polished until the surface protection material is exposed from the upper surface of the molded resin 103. The opening 107 is formed at the upper surface of the resin 103, by removing the exposed surface protection material.

Next, a chamfering is performed on one side at the upper surface of the resin 103, so as to form the groove part 138 that is C chamfered (chamfer plane) and has a linear chamfered shape.

The sensor device 130 in the modification 3 can be manufactured by the method described above. The method of manufacturing the sensor device is not limited to that described above, and various other methods may be employed. For example, the substrate mounted with the humidity sensor may be inserted into a mold having projecting parts at positions where the opening and the groove part are to be formed, and the mold may be filled with the resin, to manufacture the sensor device.

Preferable embodiments are described above. However, the present invention is not limited to the embodiments described above, and various variations and substitutions may be made to the embodiments described above without departing from the scope of the present invention recited in the claims.

In the embodiments described above, the case in which the moisture sensitive part 105 has the square shape in the top view is described as an example, however, the shape is not limited to the square shape, and may be a rectangular shape, a circular shape, or an oval shape, for example.

This application is based upon and claims the benefit of priority of Japanese Patent Application No. 2016-195036 filed on Sep. 30, 2016, and Japanese Patent Application No.

2017-052768 filed on Mar. 17, 2017, the entire contents of which are incorporated herein by reference.

DESCRIPTION OF THE REFERENCE NUMERALS 10A, 10B, 20 Humidity sensor
11, 21 Substrate
13, 23 Lower electrode
14a First moisture sensitive layer
14b Second moisture sensitive layer
15, 25 Upper electrode
16 Opening
17 Protection layer
24 Detection layer
30 Sensor element
31 Water repellent layer
44 Moisture sensitive layer
100 Sensor device
101 Substrate
102 Humidity sensor
103 Resin
104 Silicon substrate
105 Moisture sensitive part
106 Gold wire
107 Opening
108 Groove part

The invention claimed is:

1. A humidity sensor comprising:
a lower electrode formed on a substrate;
a first moisture sensitive layer covering the lower electrode;
an upper electrode formed on the first moisture sensitive layer, and having a predetermined opening pattern including a plurality of openings; and
a second moisture sensitive layer covering the upper electrode,
wherein the second moisture sensitive layer contacts the first moisture sensitive layer at the openings of the upper electrode, and
wherein an area of at least one of the openings is $2.92 \times 10^{-6}$ to $1.0 \times 10^{-2}$ times an area of the upper electrode including the openings.

2. A humidity sensor comprising:
a lower electrode formed on a substrate;
a first moisture sensitive layer covering the lower electrode;
an upper electrode formed on the first moisture sensitive layer, and having a predetermined opening pattern including a plurality of openings; and
a second moisture sensitive layer covering the upper electrode,
wherein the second moisture sensitive layer contacts the first moisture sensitive layer at the openings of the upper electrode, and
wherein a length of the openings is at least 1/350 to 1/10 a length of the upper electrode.

3. The humidity sensor as claimed in claim 2, wherein the length of the openings is 1 µm to 5 µm.

4. The humidity sensor as claimed in claim 2, wherein the upper electrode has a ladder-like pattern, and a size of a width of the openings perpendicular to a longitudinal direction of the openings is 1/100 to 1/10 a length of one side of the upper electrode along a direction perpendicular to the longitudinal direction of the openings.

5. The humidity sensor as claimed in claim 2, wherein the upper electrode has a ladder-like pattern, and a size of a width of the openings perpendicular to a longitudinal direction of the openings is 1 µm to 5 µm.

6. The humidity sensor as claimed in claim 2, wherein outlines of regions where the lower electrode and the upper electrode overlap in a plan view have a shape approximating a shape of openings of a sensor device to which the humidity sensor is mounted.

7. A humidity sensor comprising:
a lower electrode formed on a substrate;
a first moisture sensitive layer covering the lower electrode;
an upper electrode formed on the first moisture sensitive layer, and having a predetermined opening pattern including a plurality of openings; and
a second moisture sensitive layer covering the upper electrode,
wherein the second moisture sensitive layer contacts the first moisture sensitive layer at the openings of the upper electrode, and
wherein a thickness T1 of the first moisture sensitive layer and a thickness T2 of the second moisture sensitive layer,
relationships T1<T2 and T2<=10*T1, where a symbol * denotes a multiplication.

8. The humidity sensor as claimed in claim 2, further comprising:
a protection layer formed on the second moisture sensitive layer, and located above the upper electrode.

9. The humidity sensor as claimed in claim 2, further comprising:
a protection layer covering an upper surface and side surfaces of the upper electrode,
wherein the second moisture sensitive layer covers the upper electrode and the protection layer.

10. The humidity sensor as claimed in claim 2, further comprising:
a protection layer formed on the second moisture sensitive layer, and located above the openings.

11. The humidity sensor as claimed in claim 1, wherein the upper electrode, in a plan view, has a pattern selected from a group consisting of a lattice-like pattern, a staggered pattern, and a ladder-like pattern.

12. The humidity sensor as claimed in claim 1, further comprising:
a protection layer formed on the second moisture sensitive layer, and located above the upper electrode.

13. The humidity sensor as claimed in claim 1, further comprising:
a protection layer covering an upper surface and side surfaces of the upper electrode,
wherein the second moisture sensitive layer covers the upper electrode and the protection layer.

14. The humidity sensor as claimed in claim 1, further comprising:
a protection layer formed on the second moisture sensitive layer, and located above the openings.

15. The humidity sensor as claimed in claim 2, wherein the upper electrode, in a plan view, has a pattern selected from a group consisting of a lattice-like pattern, a staggered pattern, and a ladder-like pattern.

16. The humidity sensor as claimed in claim 7, wherein the upper electrode, in a plan view, has a pattern selected from a group consisting of a lattice-like pattern, a staggered pattern, and a ladder-like pattern.

17. The humidity sensor as claimed in claim 7, further comprising:
- a protection layer formed on the second moisture sensitive layer, and located above the upper electrode.

18. The humidity sensor as claimed in claim 7, further comprising:
- a protection layer covering an upper surface and side surfaces of the upper electrode,
- wherein the second moisture sensitive layer covers the upper electrode and the protection layer.

19. The humidity sensor as claimed in claim 7, further comprising:
- a protection layer formed on the second moisture sensitive layer, and located above the openings.

* * * * *